(12) United States Patent
Kim

(10) Patent No.: US 11,725,334 B2
(45) Date of Patent: Aug. 15, 2023

(54) CLOTHES TREATING APPARATUS PROVIDED INSIDE VEHICLE

(71) Applicant: LG Electronics Inc., Seoul (KR)

(72) Inventor: Soyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 17/431,055

(22) PCT Filed: Feb. 13, 2019

(86) PCT No.: PCT/KR2019/001772
§ 371 (c)(1),
(2) Date: Aug. 13, 2021

(87) PCT Pub. No.: WO2020/166738
PCT Pub. Date: Aug. 20, 2020

(65) Prior Publication Data
US 2022/0145526 A1    May 12, 2022

(51) Int. Cl.
*D06F 73/02* (2006.01)
*B60N 3/00* (2006.01)
*G06V 20/59* (2022.01)
*B60N 2/90* (2018.01)
*B60R 7/10* (2006.01)
*D06F 58/10* (2006.01)

(52) U.S. Cl.
CPC .............. *D06F 73/02* (2013.01); *B60N 3/00* (2013.01); *G06V 20/59* (2022.01); *B60N 2002/905* (2018.02); *B60R 7/10* (2013.01); *D06F 58/10* (2013.01)

(58) Field of Classification Search
CPC ........... B60R 7/10; D06F 58/10; D06F 73/02; G06V 20/59; B60N 3/00; B60N 2002/905
See application file for complete search history.

(56) References Cited

U.S. PATENT DOCUMENTS

2005/0120757 A1    6/2005   Jackson

FOREIGN PATENT DOCUMENTS

| JP | 09-142195 | 6/1997 |
|----|-----------|--------|
| JP | 2006-001494 | 1/2006 |
| KR | 200143567 | 1/1999 |
| KR | 20180119486 | 11/2018 |

OTHER PUBLICATIONS

PCT International Search Report in International Appln. No. PCT/KR2019/001772, dated Nov. 7, 2019, 5 pages.

*Primary Examiner* — Benjamin L Osterhout
(74) *Attorney, Agent, or Firm* — Fish & Richardson P.C.

(57) ABSTRACT

Disclosed is a clothes treating apparatus provided inside a vehicle. The clothes treating apparatus provided inside a vehicle comprises: a clothes accommodation part providing an interior space and installed on a seat; a door for opening and closing the interior space; a supply part for supplying hot air or steam to the interior space; an interface for transmitting and receiving information to and from at least one device provided inside the vehicle; and a processor for opening the door if a predetermined condition is satisfied, wherein the predetermined condition is determined based on at least one from among the degree of air pollution inside the vehicle or a gesture of a passenger recognized by at least one sensor, and the processor may control an operation course of the supply part based on the travelling state information of the vehicle or the vehicle boarding pattern of the passenger.

8 Claims, 26 Drawing Sheets

[FIG. 1]
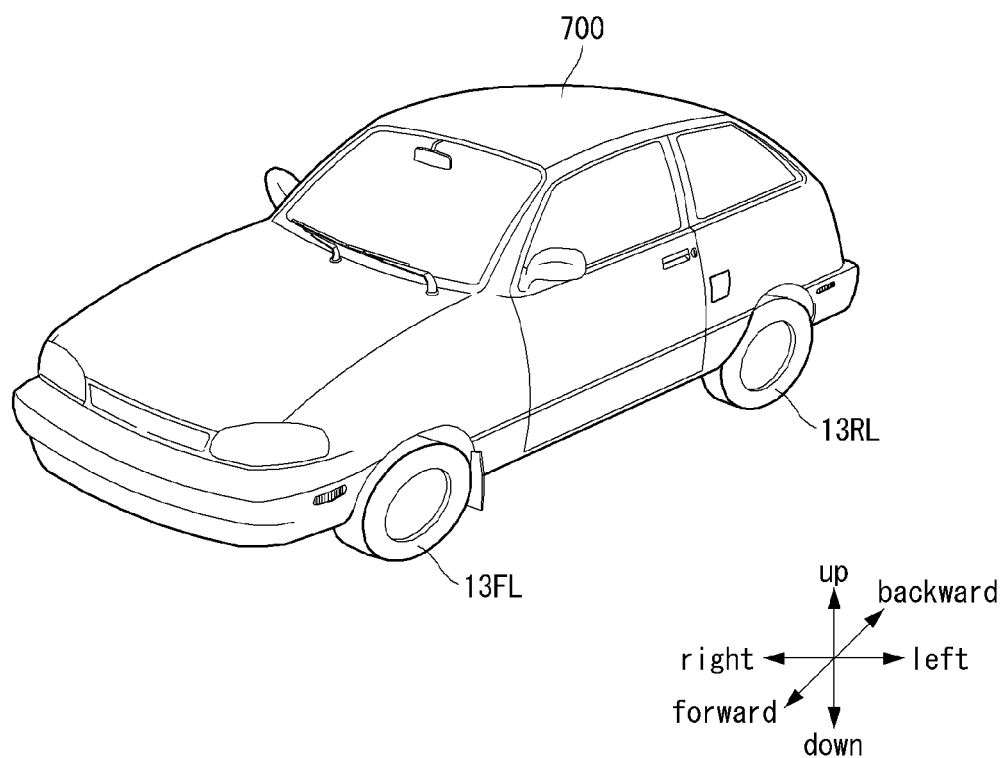

[FIG. 2]
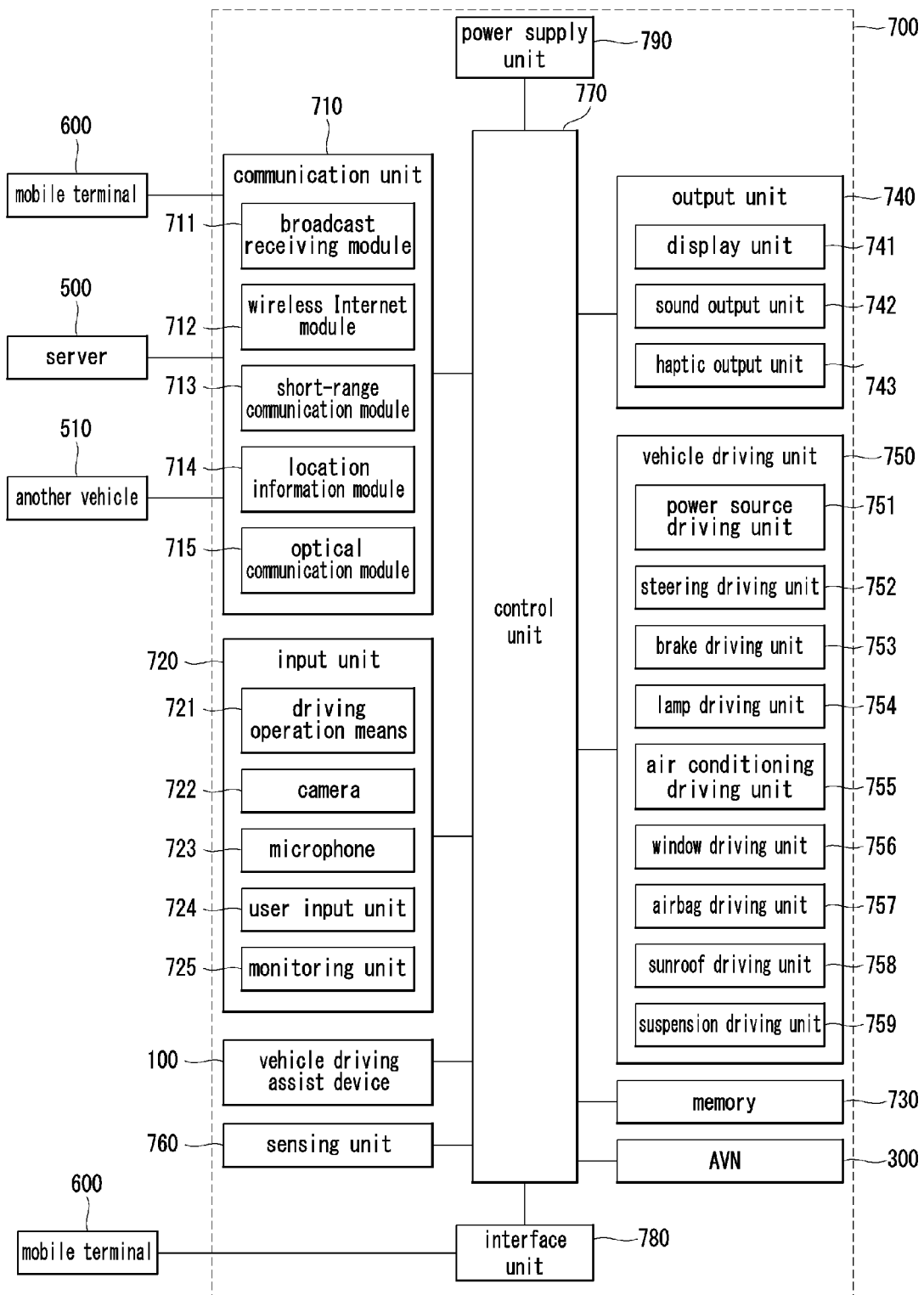

【FIG. 3】
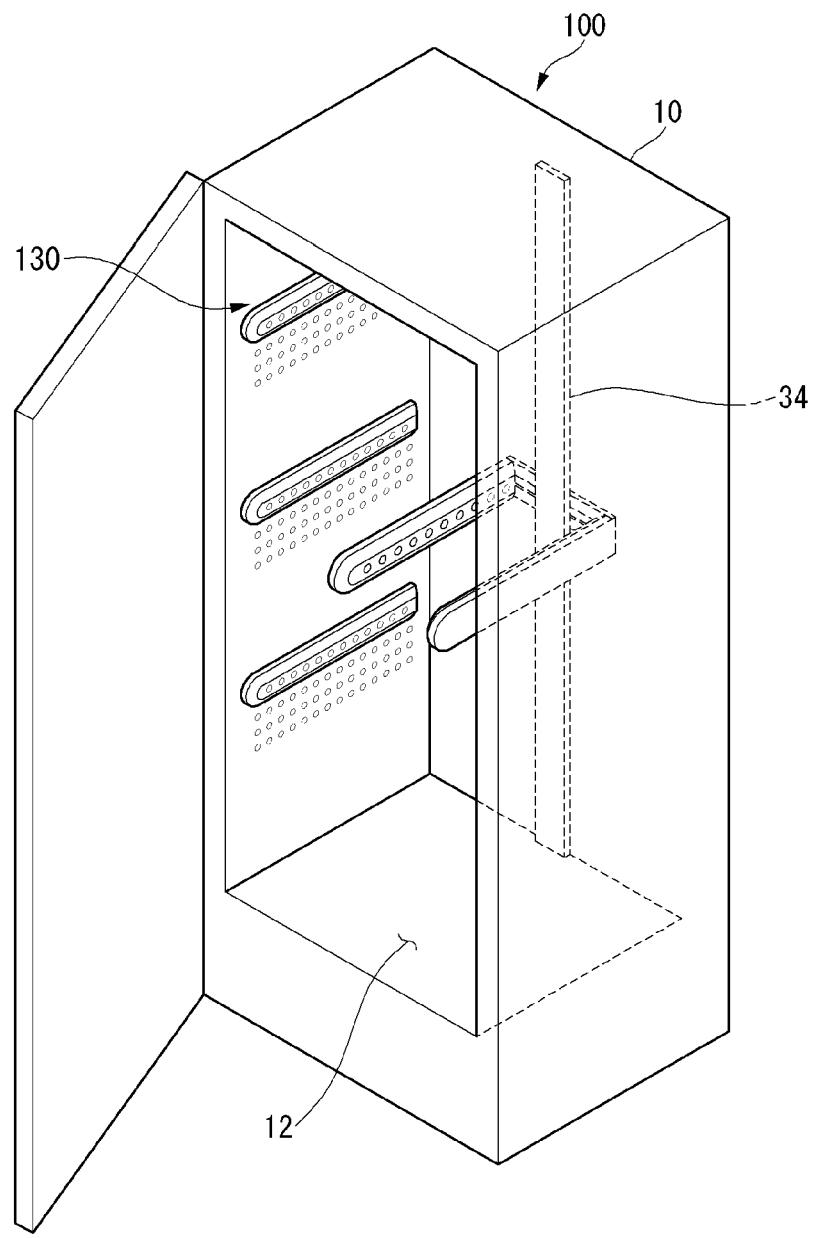

[FIG. 4]
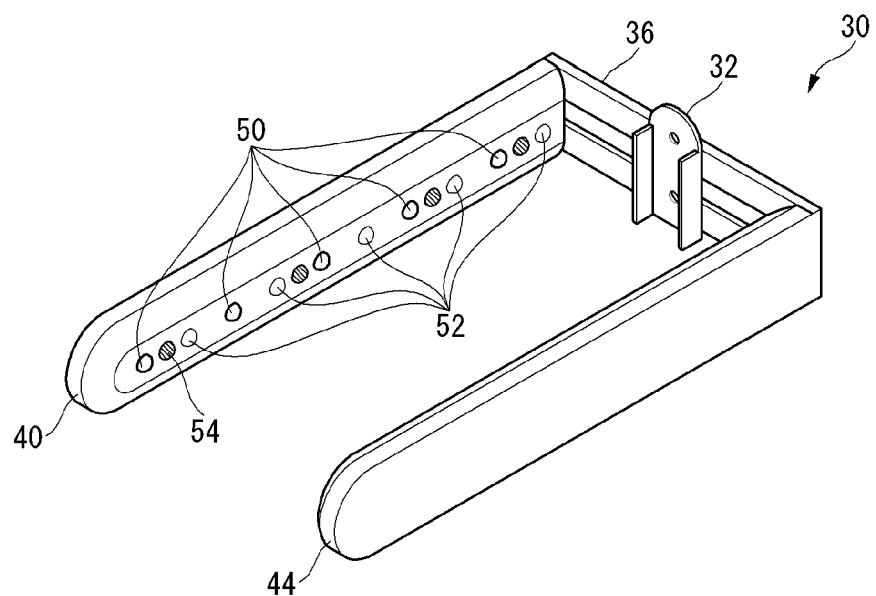
[FIG. 5]
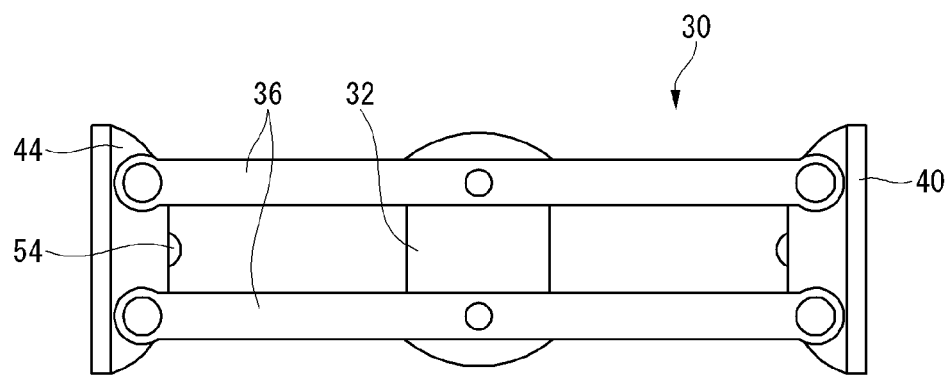

【FIG. 6】
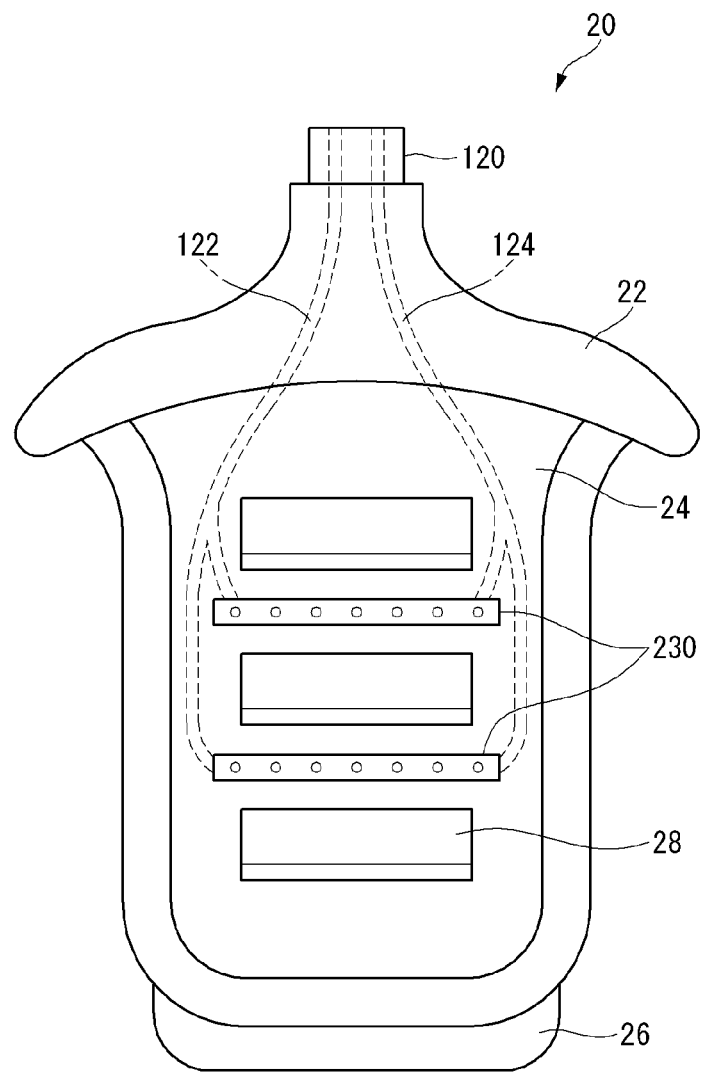

[FIG. 7]
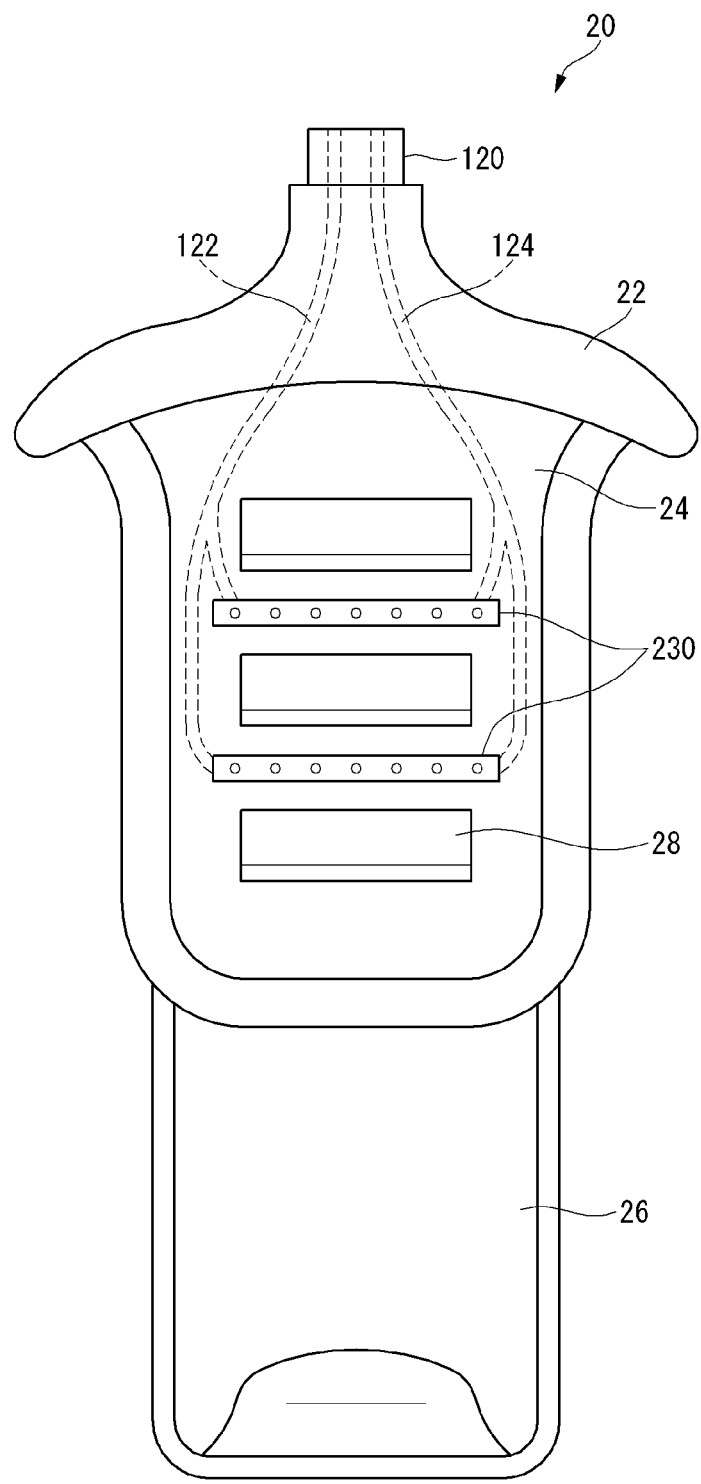

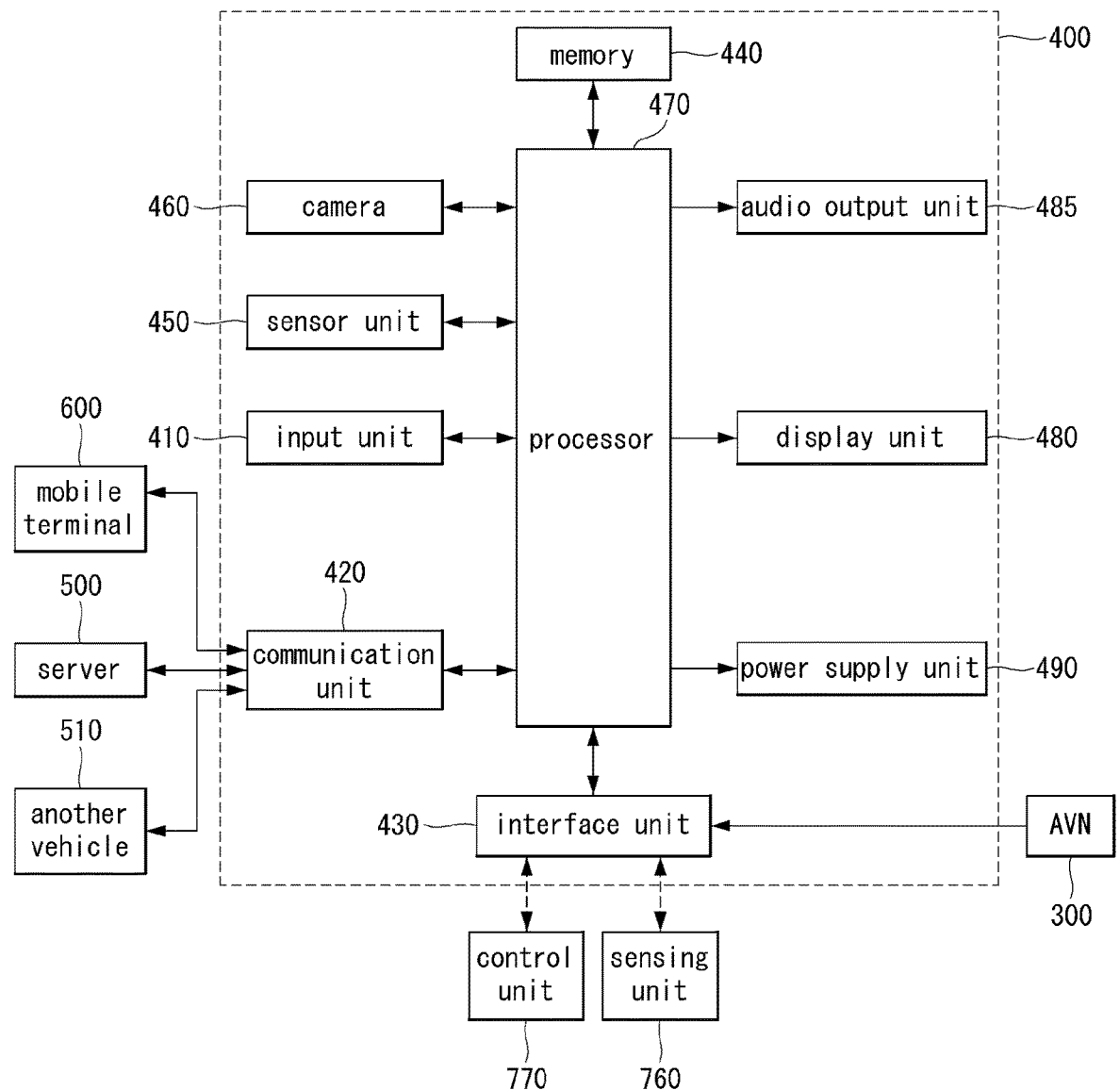
[FIG. 8]

[FIG. 9]
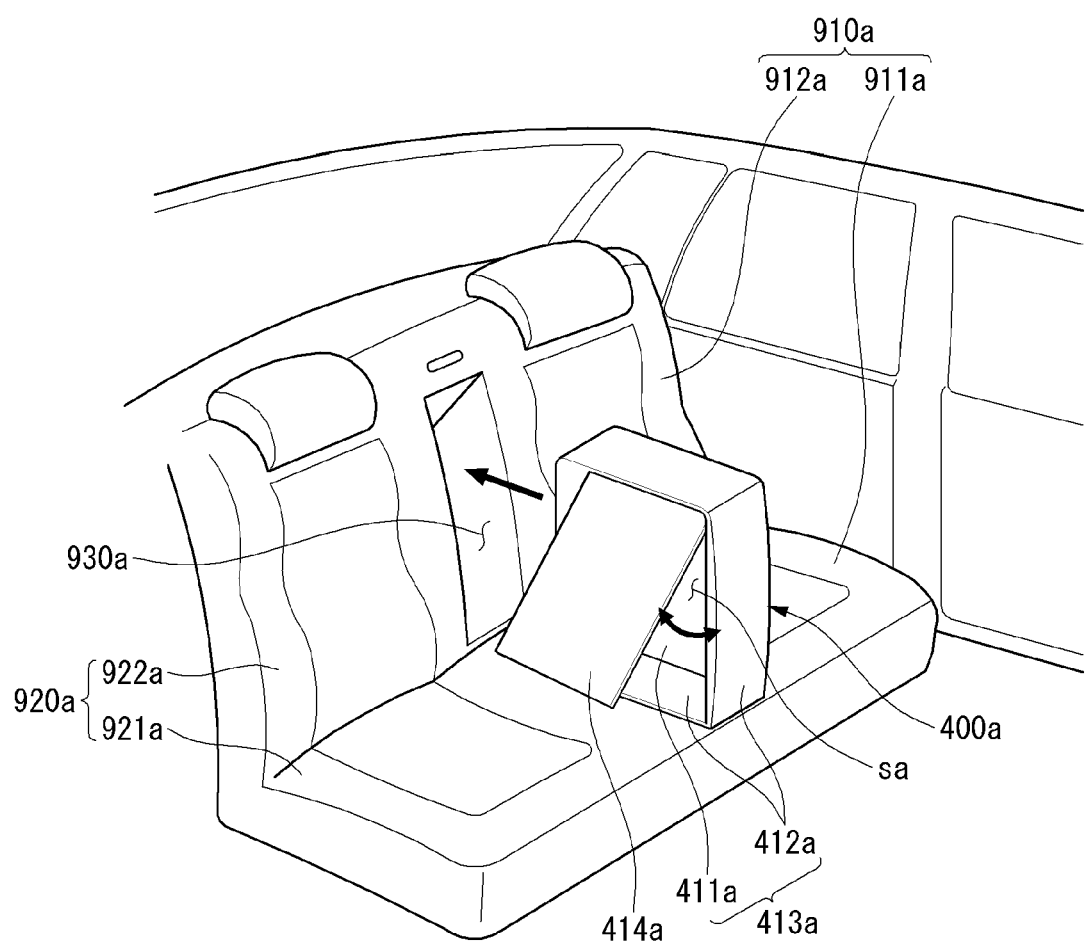

[FIG. 10]
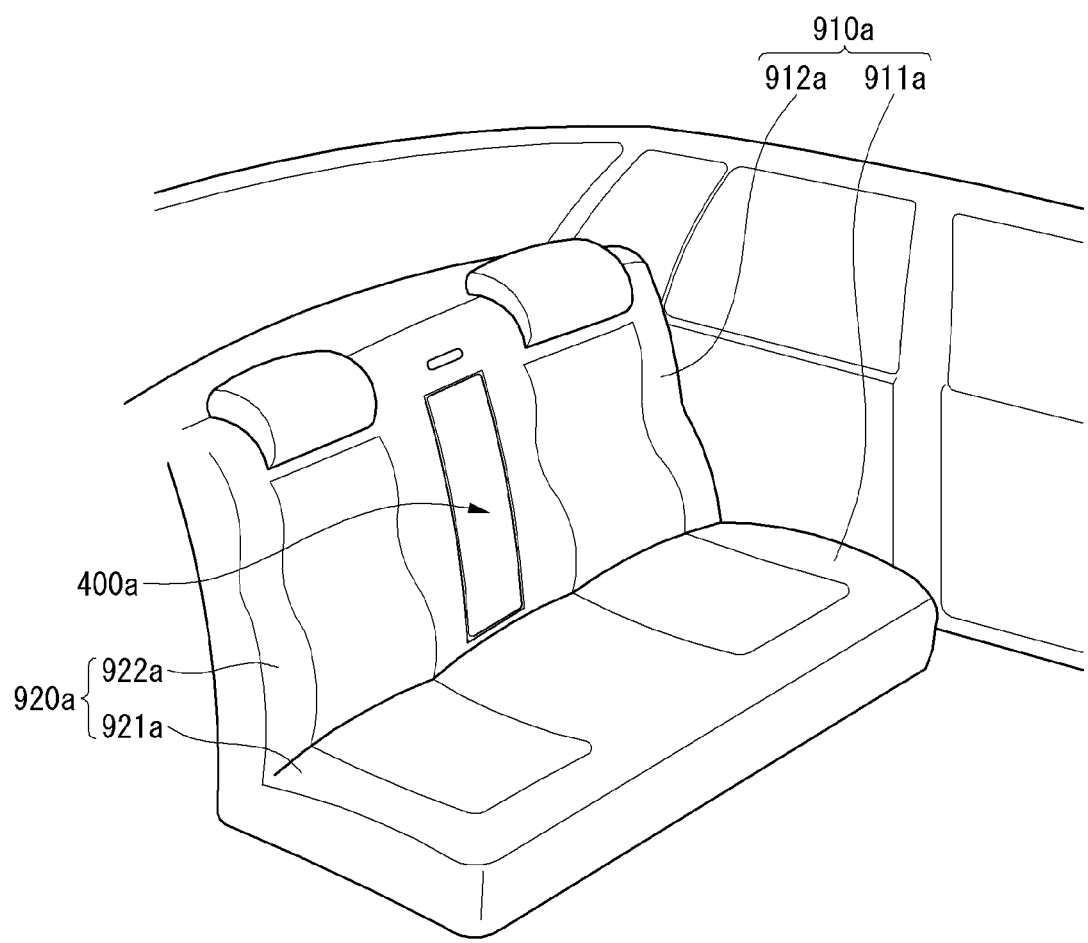

【FIG. 11】
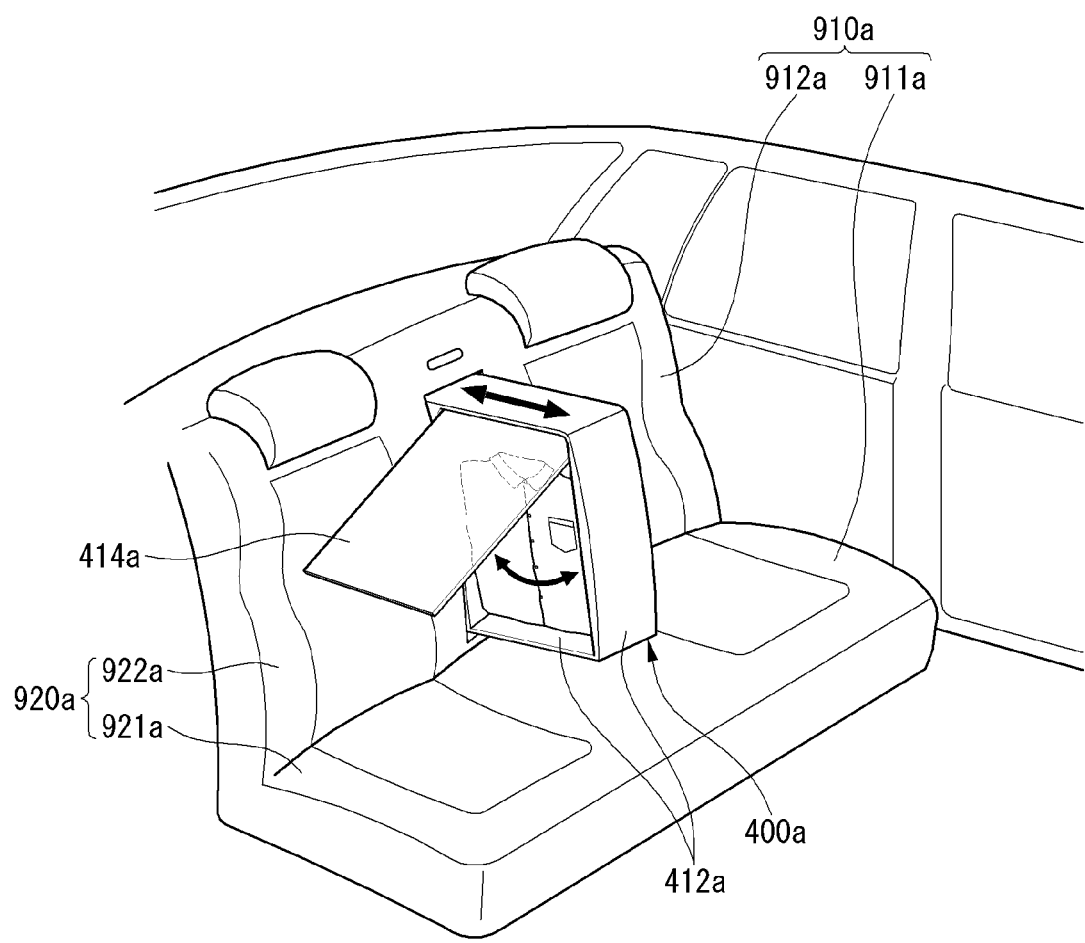

[FIG. 12]
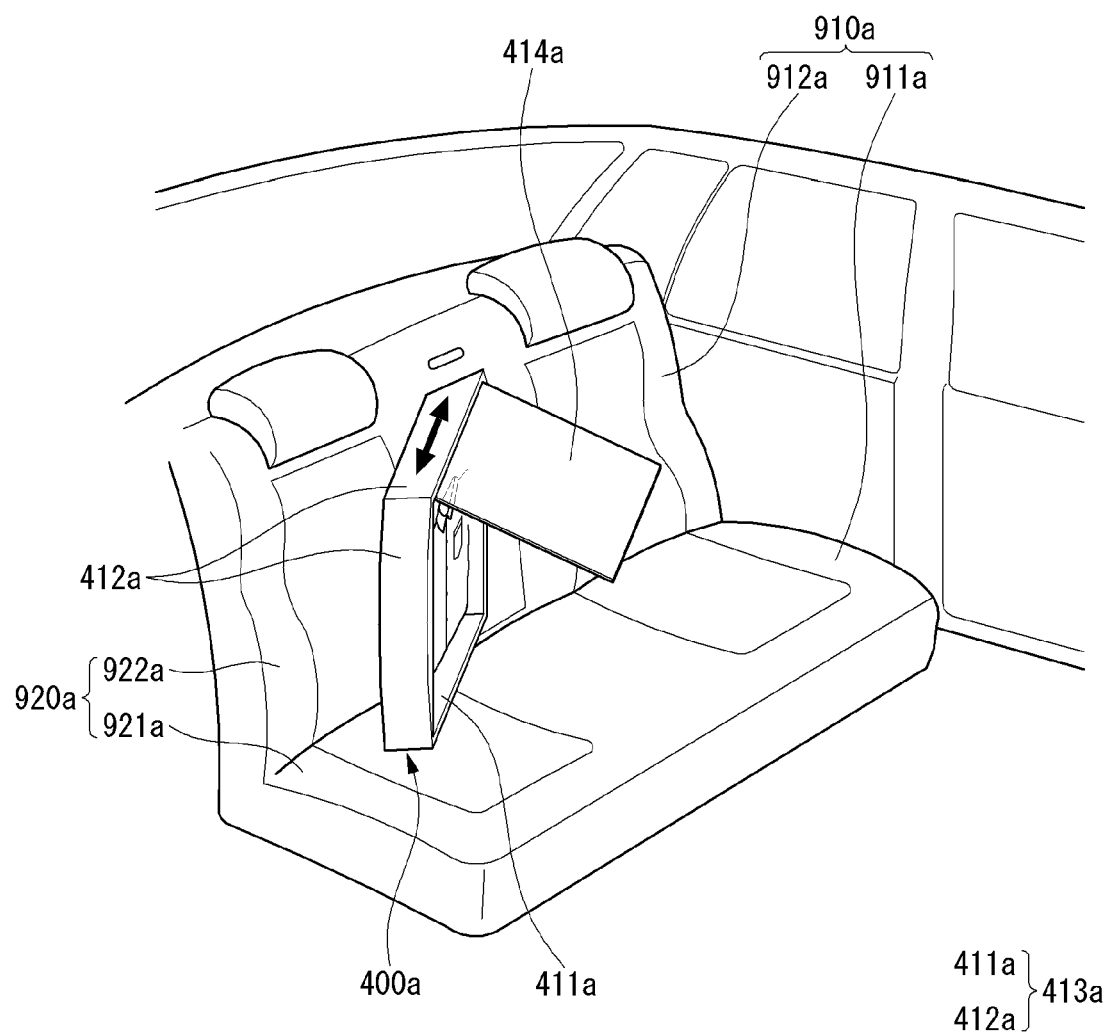

[FIG. 13]
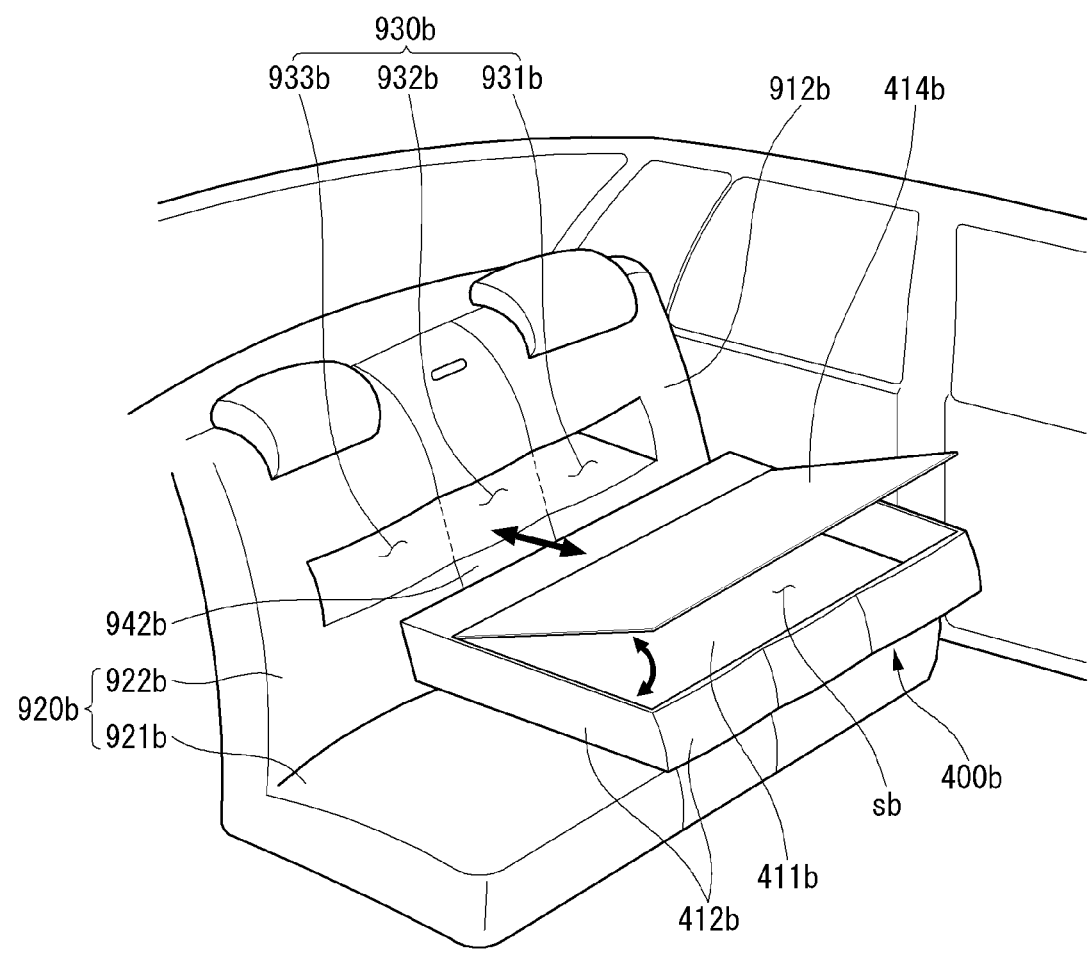

[FIG. 14]
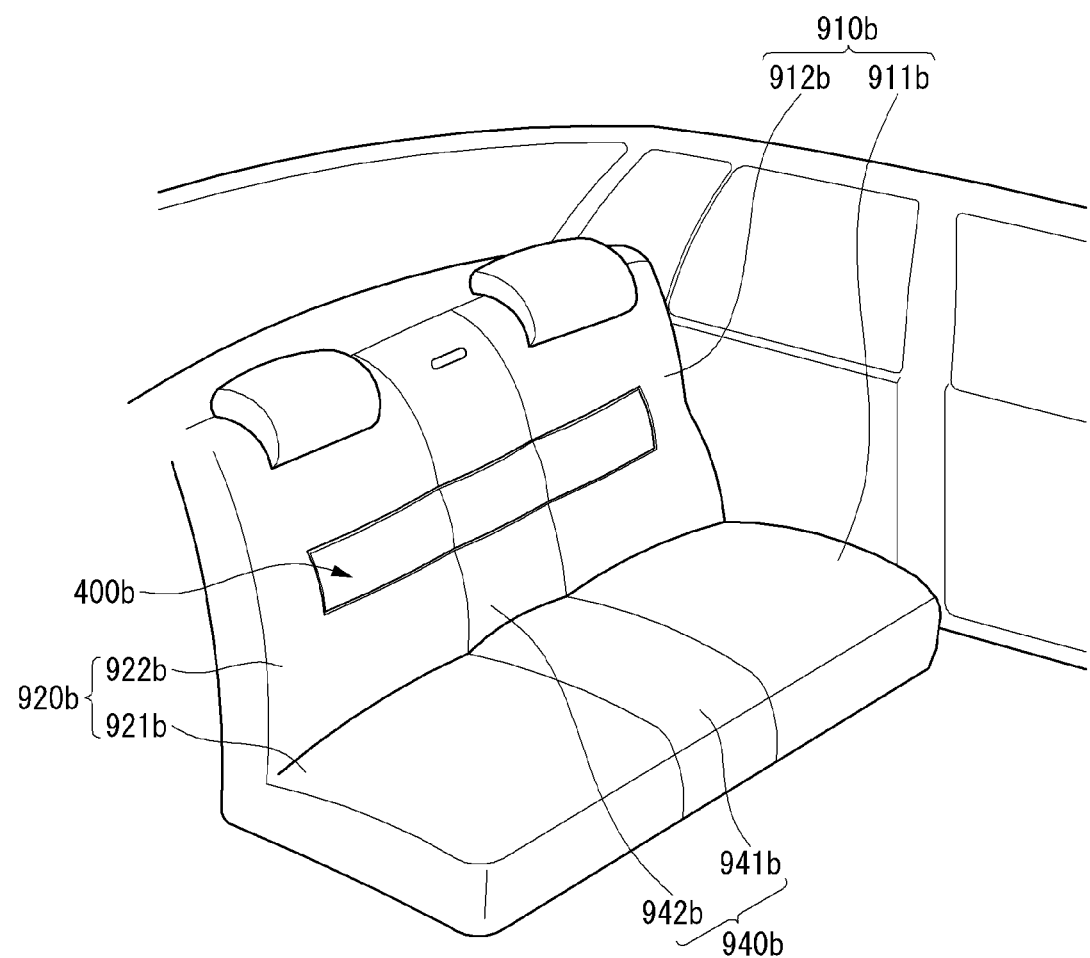

[FIG. 15]
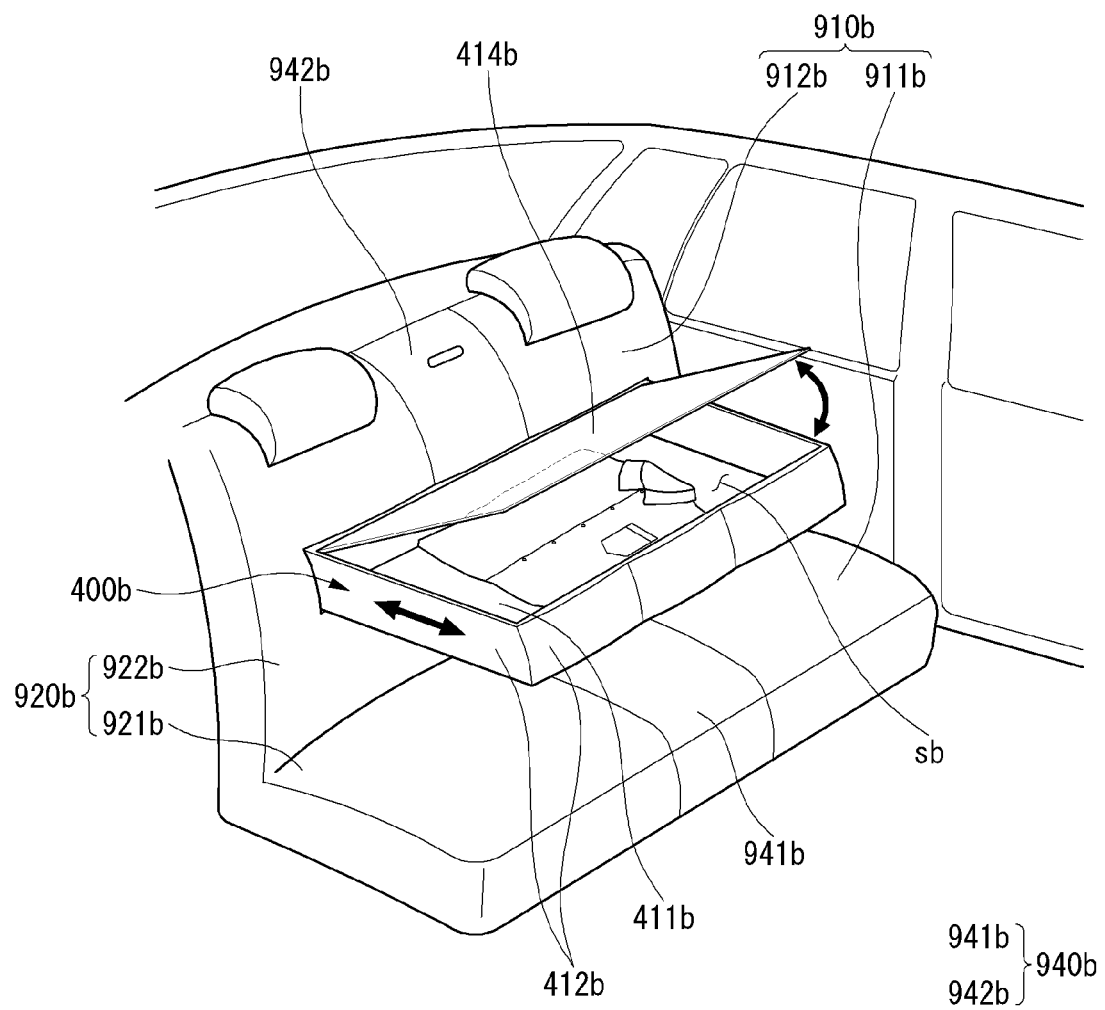

[FIG. 16]
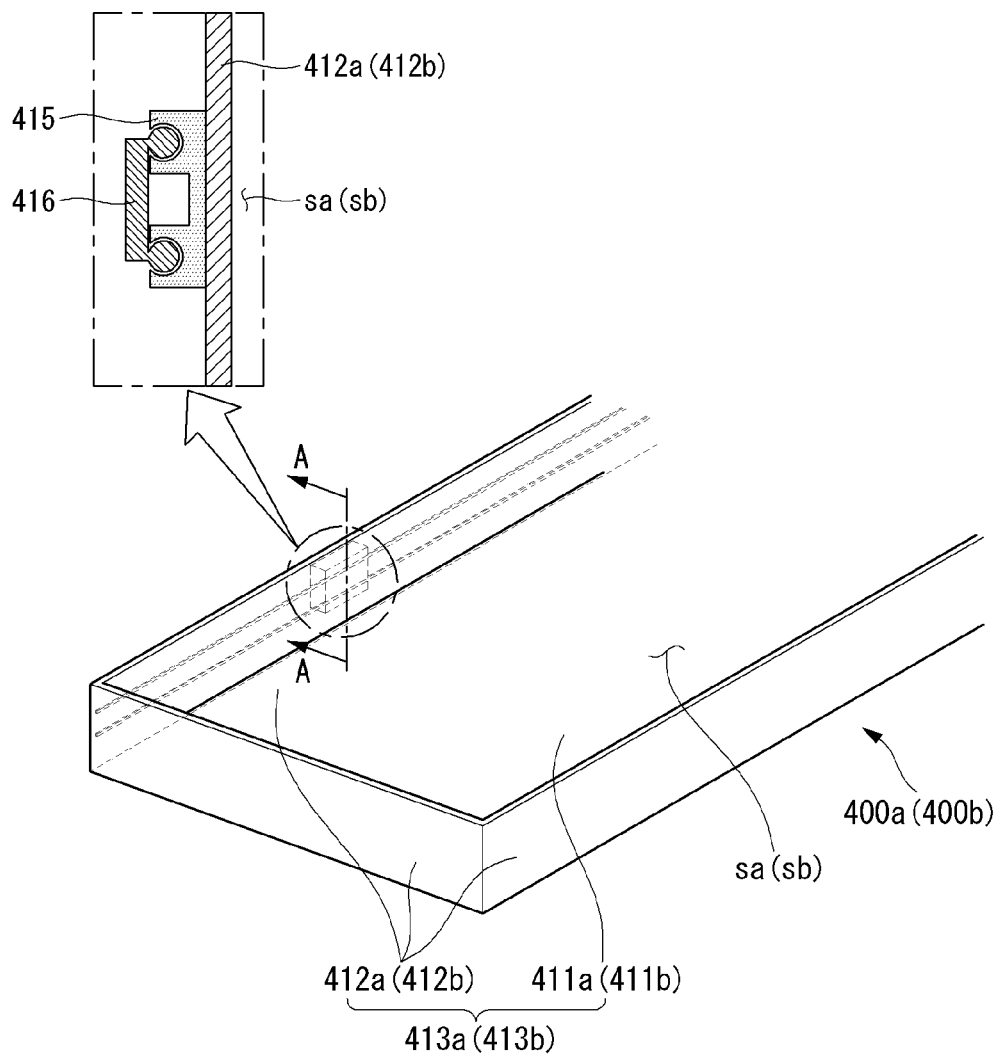

[FIG. 17]
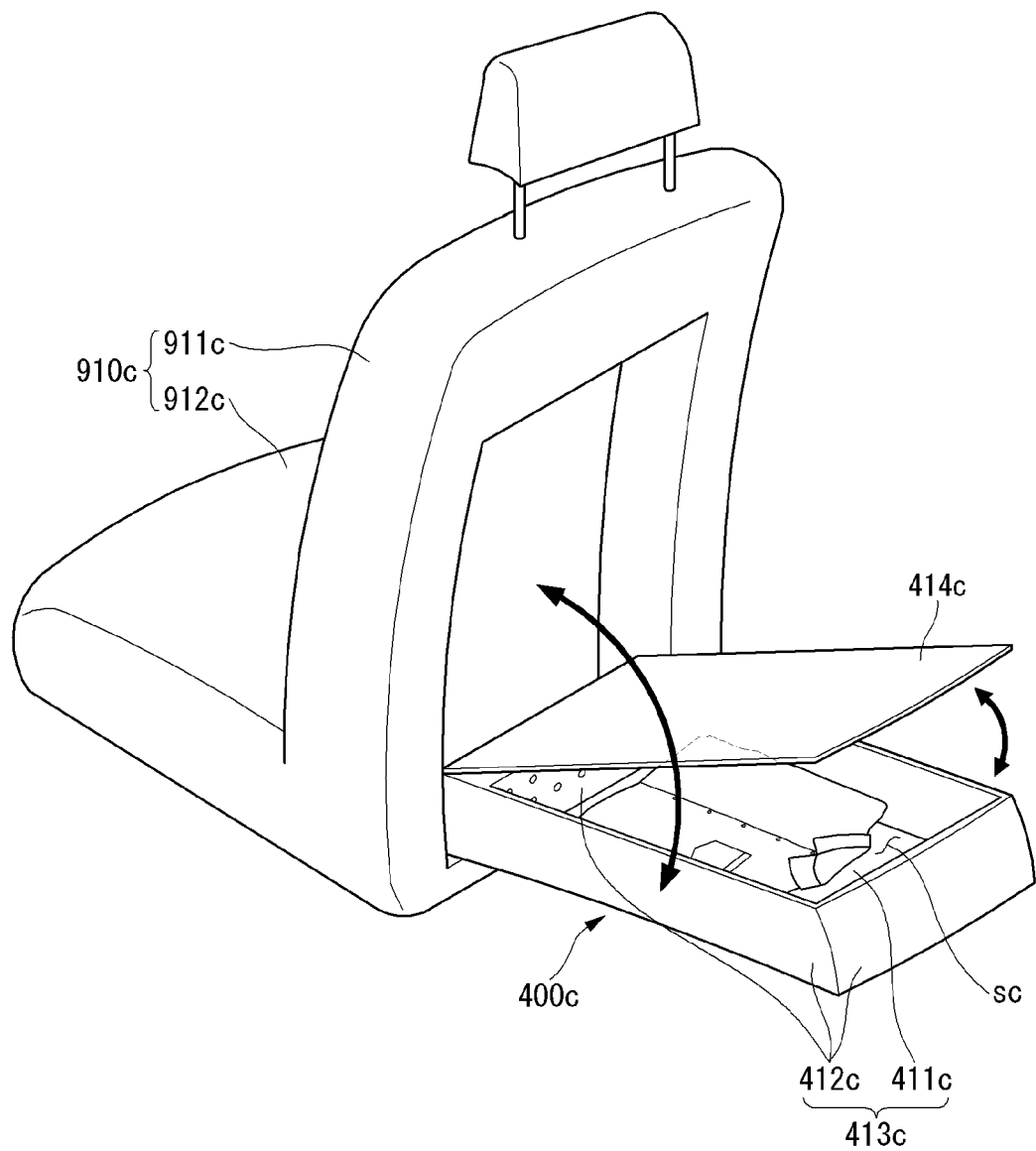

[FIG. 18]
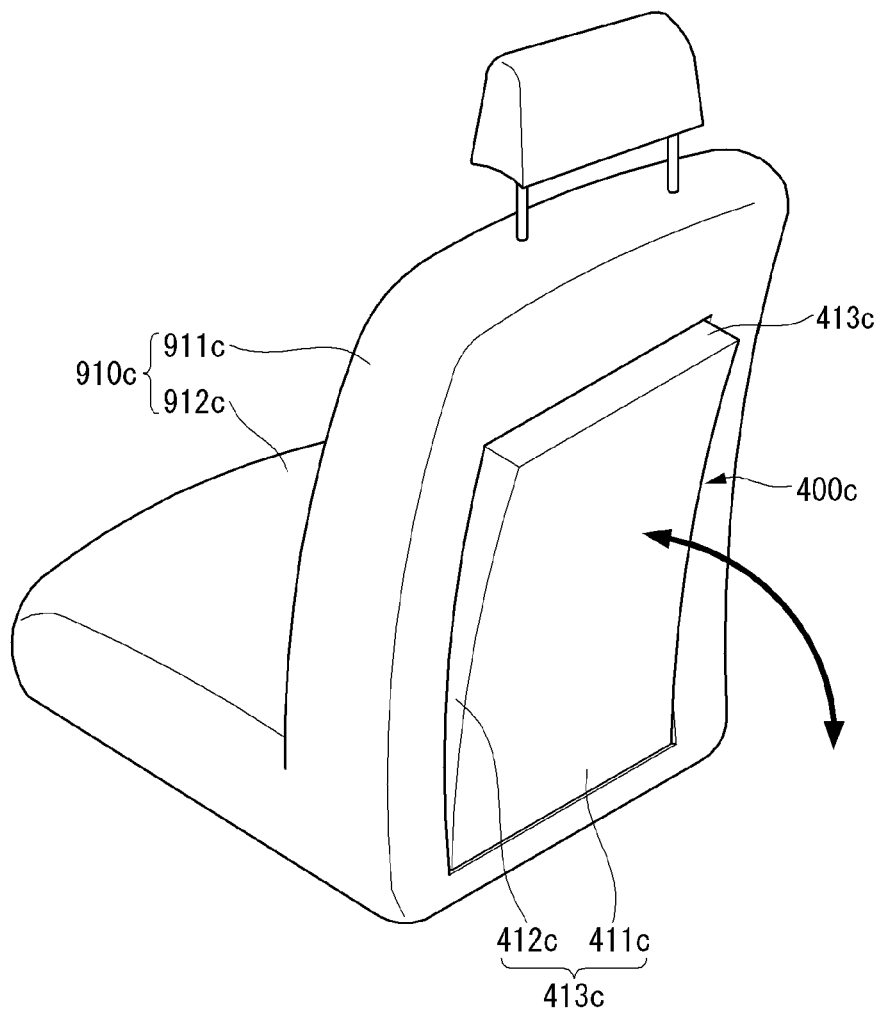

[FIG. 19]
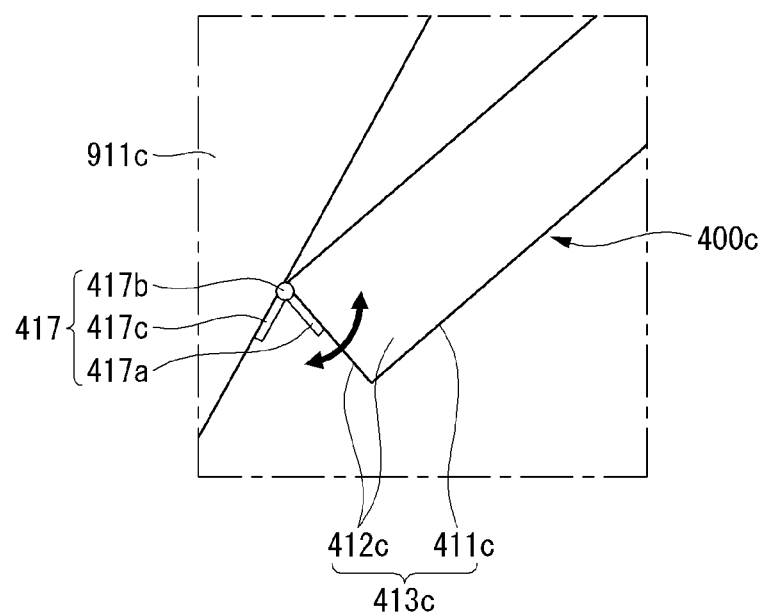
[FIG. 20]
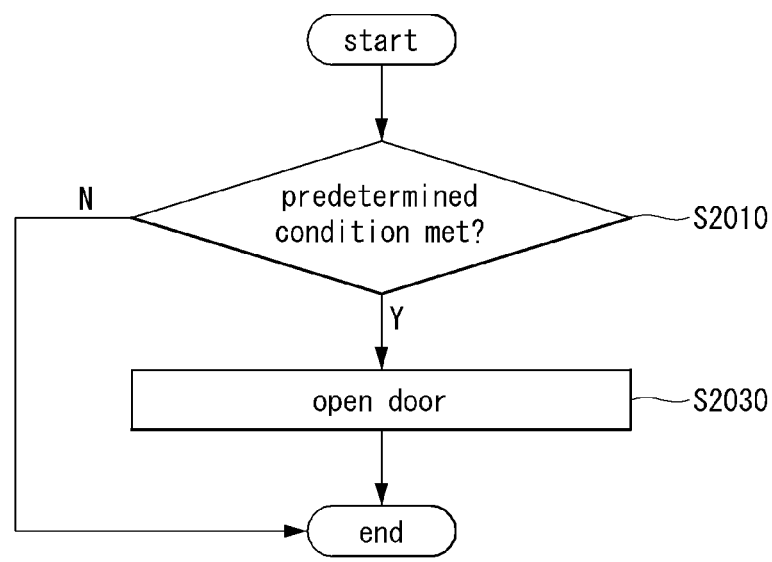

[FIG. 21]
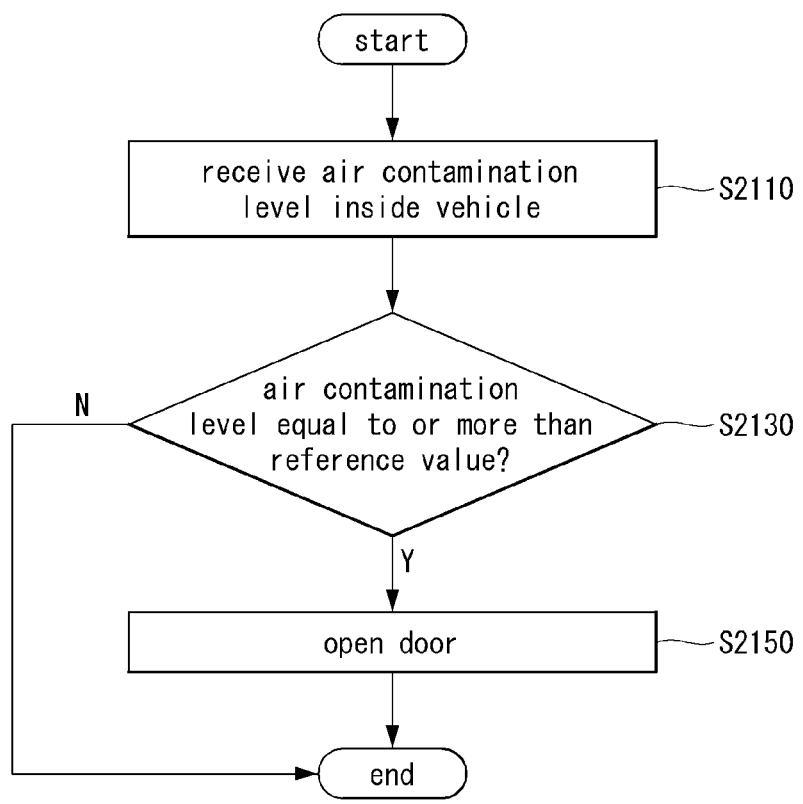

[FIG. 22]
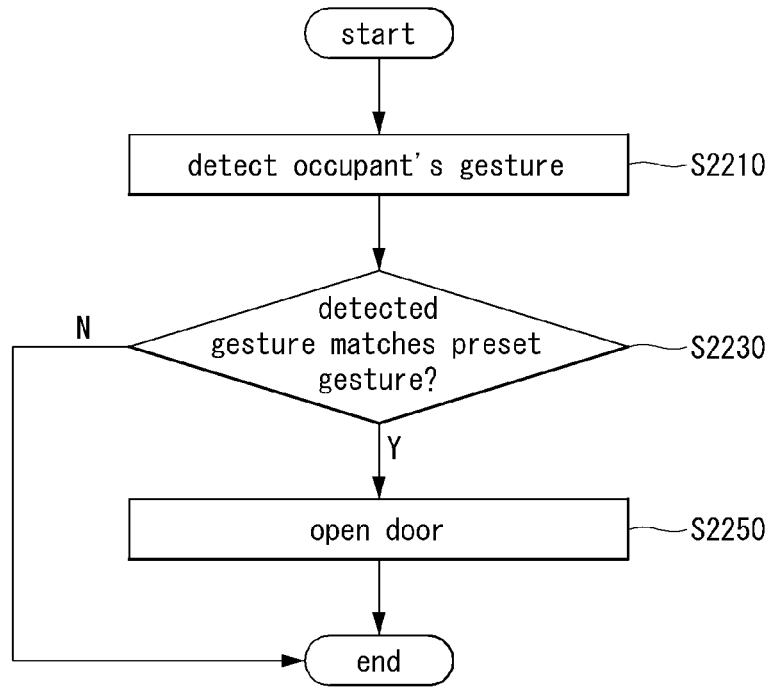
[FIG. 23]
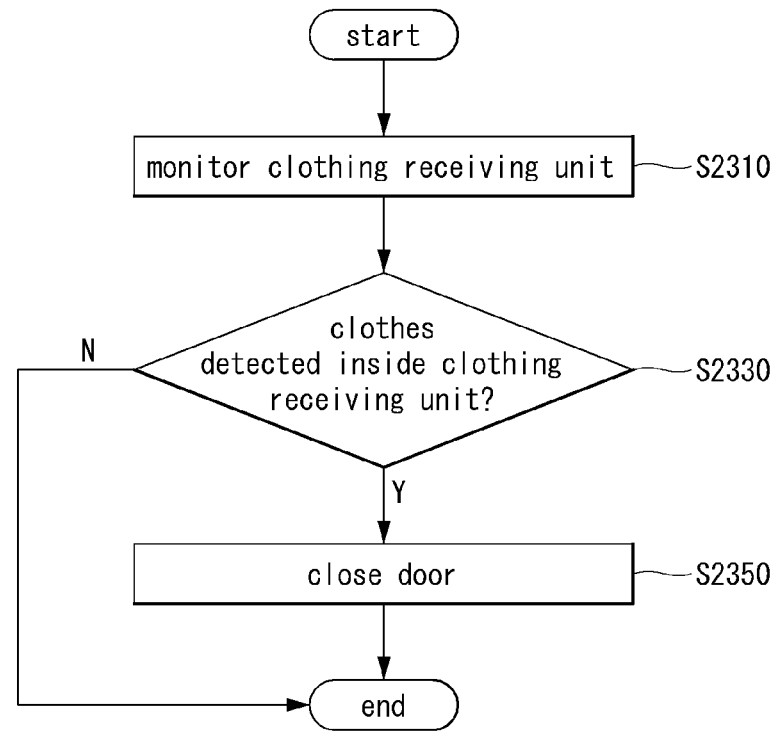

[FIG. 24]
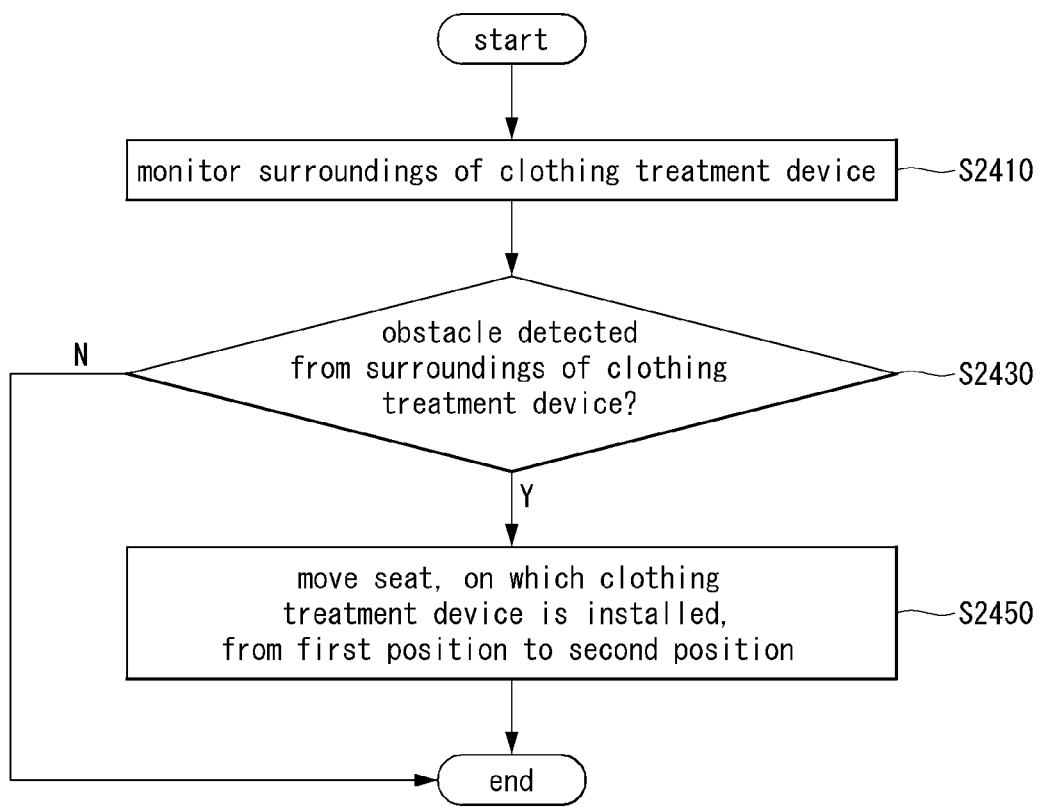

[FIG. 25]
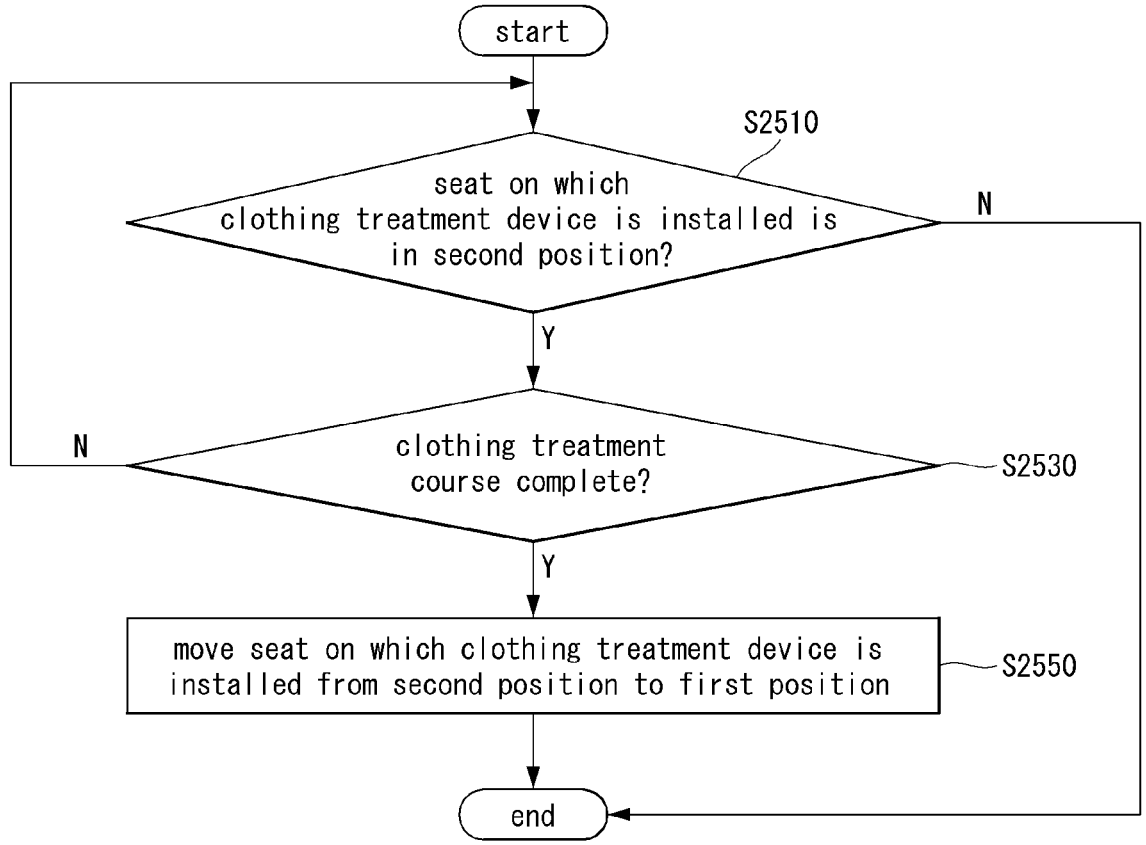
[FIG. 26]
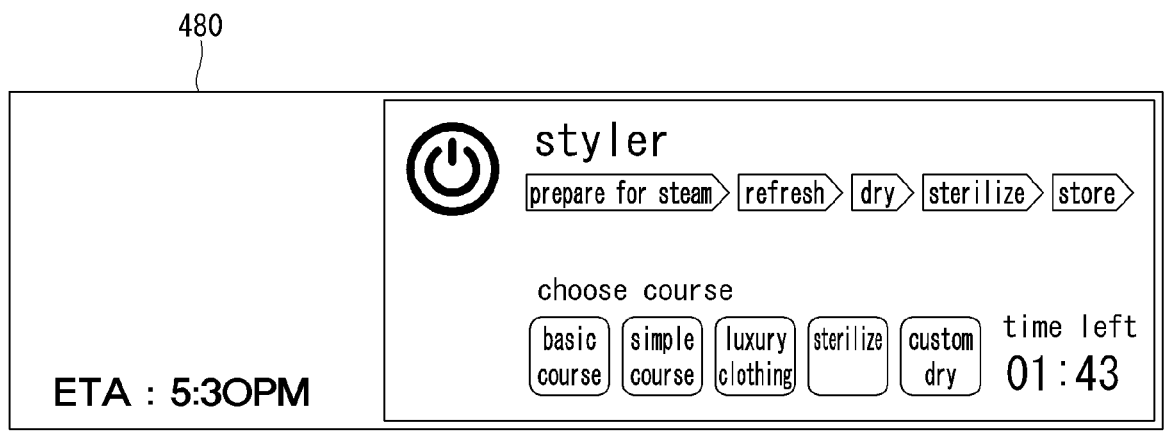

[FIG. 27]
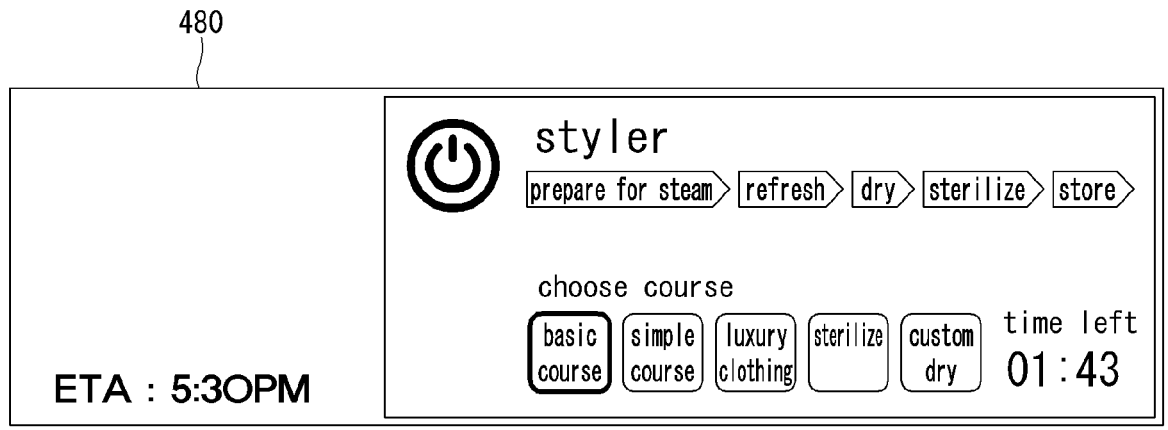
(a)
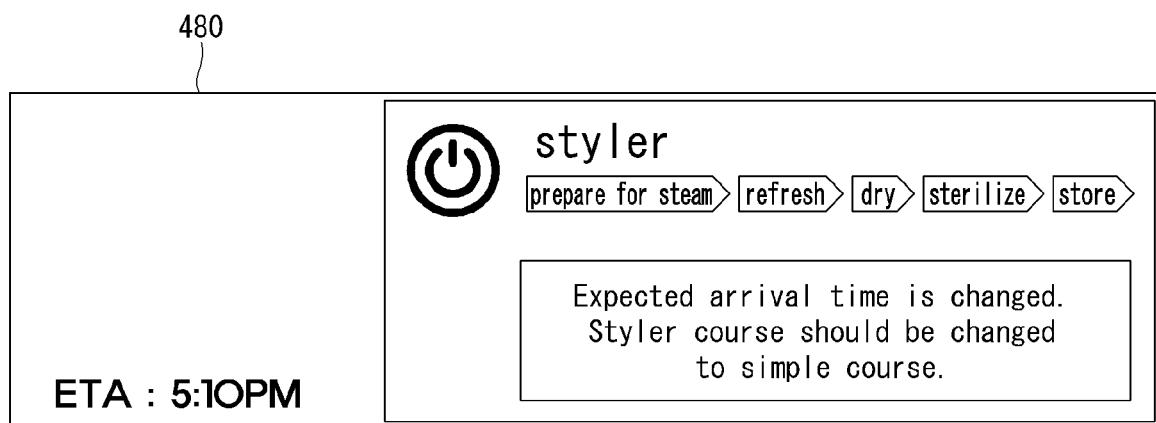
(b)
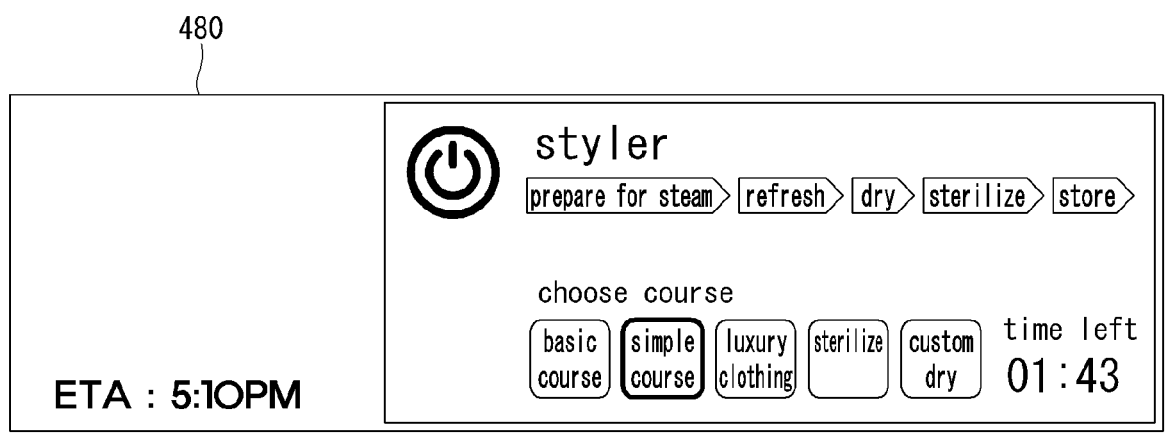
(c)

[FIG. 28]
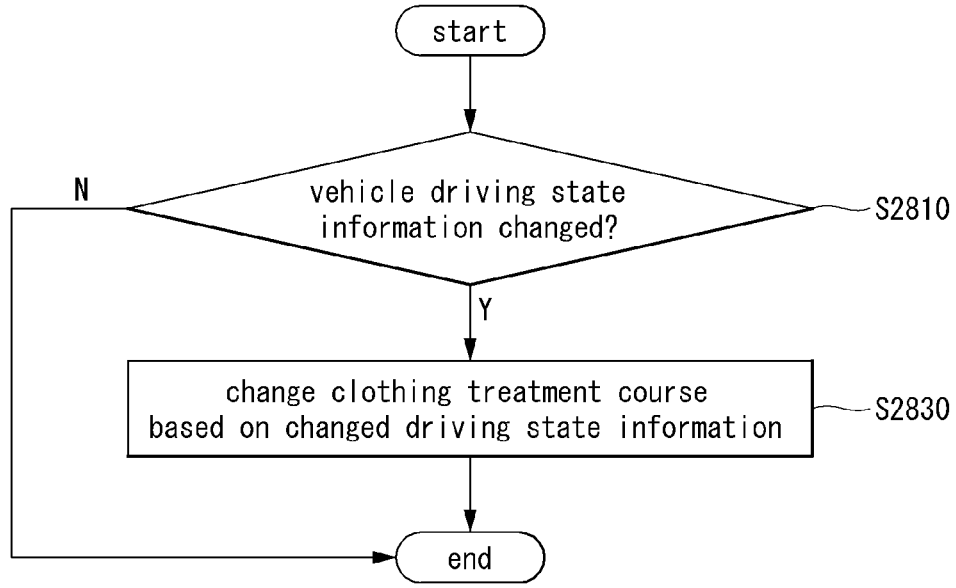
[FIG. 29]
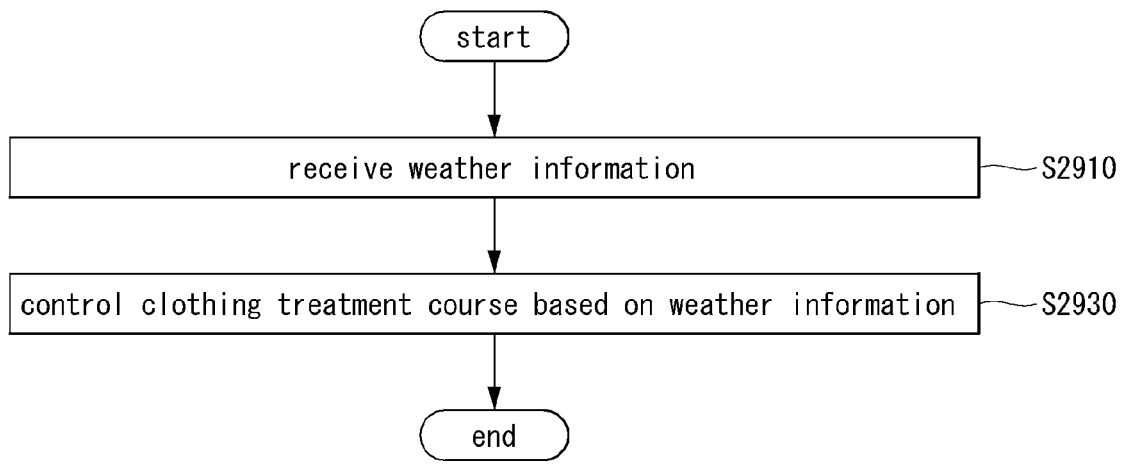

[FIG. 30]
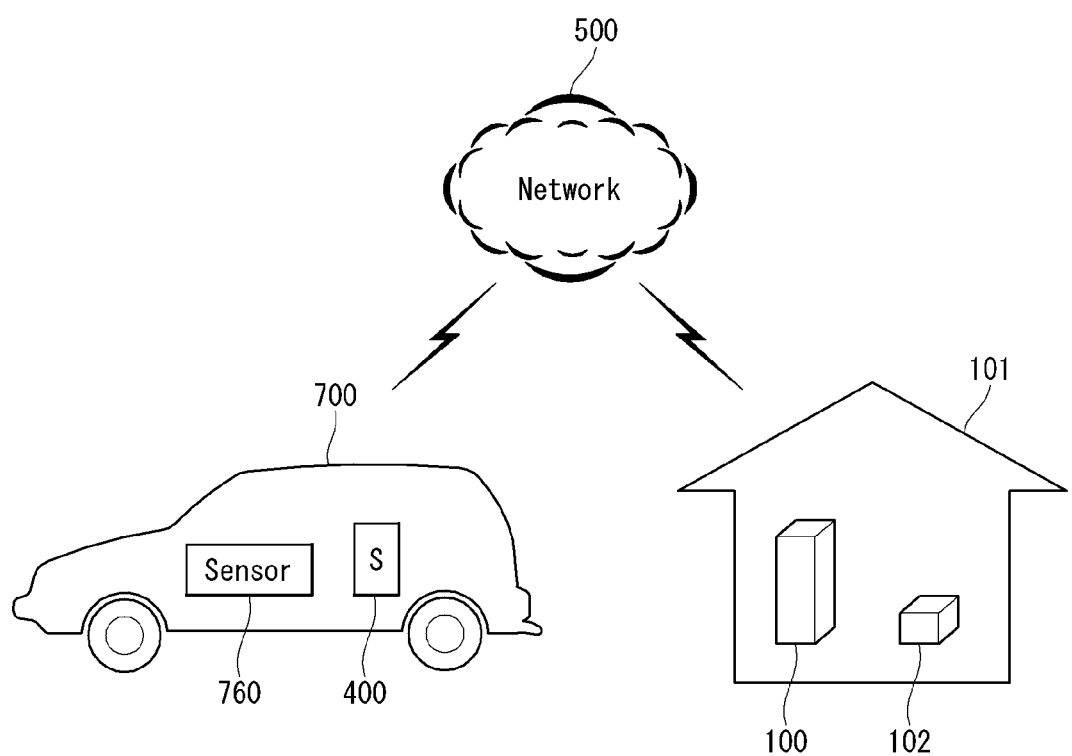

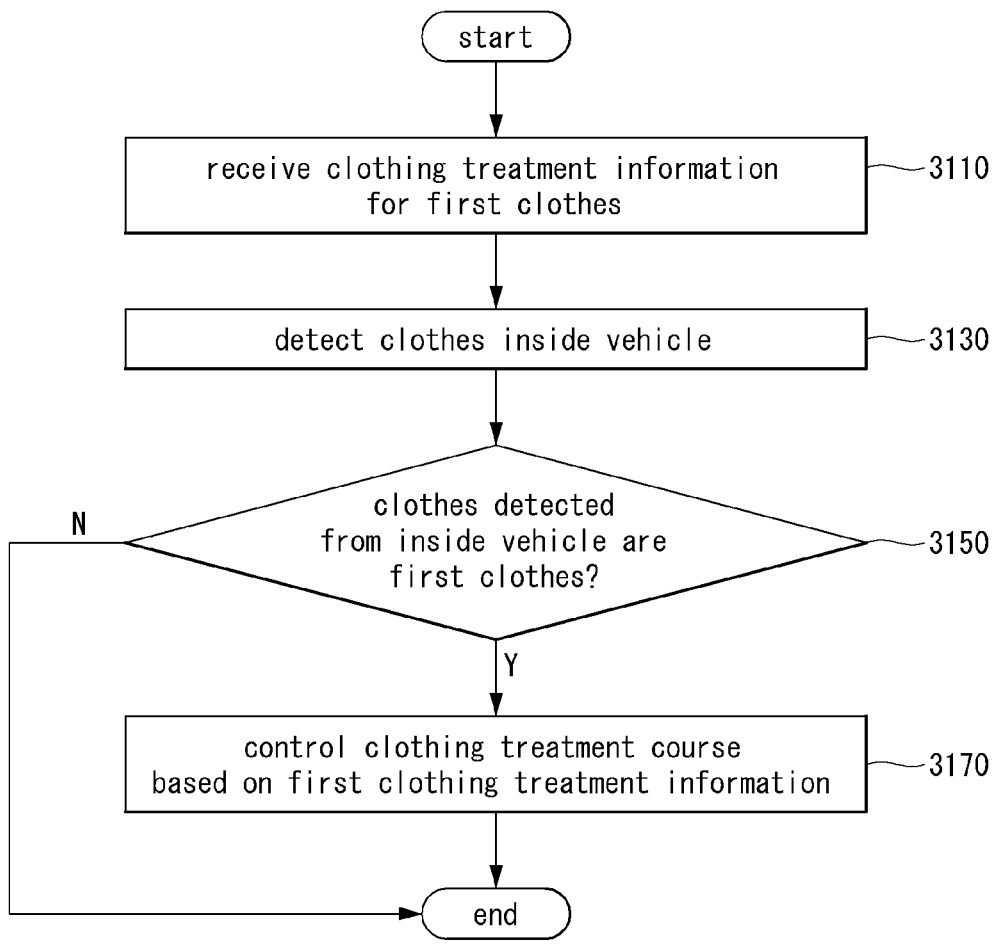

CLOTHES TREATING APPARATUS PROVIDED INSIDE VEHICLE

CROSS-REFERENCE TO RELATED APPLICATIONS

This application is the National Stage filing under 35 U.S.C. 371 of International Application No. PCT/KR2019/001772, filed on Feb. 13, 2019, the contents of which are all hereby incorporated by reference herein in their entirety.

TECHNICAL FIELD

The disclosure relates to a clothing treatment device provided in a vehicle.

BACKGROUND ART

Vehicles may be classified into internal combustion engine vehicles, external combustion engine vehicles, gas turbine vehicles, and electric vehicles depending on how they are powered.

Recently, smart vehicles are being actively developed for the safety and convenience of drivers and pedestrians, and research on sensors mounted to intelligent vehicles is being vigorously conducted. Cameras, infrared sensors, radars, GPS, lidars, and gyroscopes are being used in intelligent automobiles, and among them, cameras serve as the human eyes.

With the development of various sensors and electronic devices, vehicles equipped with features for assisting in driving and enhancing driving safety and convenience are attracting attention.

DISCLOSURE

Technical Problem

An object of the disclosure may be to provide a clothing treatment device installed in a vehicle.

Another object may be to provide a clothing treatment device that is activated according to a predetermined condition.

Another object may be to provide a clothing treatment device that controls an operation course according to a predetermined condition.

Technical Solution

To achieve the foregoing objectives, according to at least one embodiment of the disclosure, a clothing treatment device provided in a vehicle comprises a clothing receiving unit providing an internal space and installed on a seat in the vehicle, a door opening and closing the internal space, a supply unit supplying hot air or steam to the internal space, an interface transmitting and receiving information to/from at least one device provided in the vehicle, and a processor opening the door when a predetermined condition is met. The predetermined condition may be determined through at least one of a degree of air pollution in the vehicle recognized by at least one sensor provided in the vehicle or an occupant's gesture. The processor may control an operation course of the supply unit based on at least one of driving state information for the vehicle or the occupant's vehicle boarding pattern.

The clothing treatment device may further comprise a sensor unit monitoring the internal space of the clothing receiving unit. The processor may close the door when clothing is detected The interface may be connected with a camera capturing surroundings of the seat. The processor may move the seat from a first position to a second position and open the door when an obstacle around the seat is detected via the camera.

The processor may move the seat from the second position to the first position when an operation of the supply unit is complete.

The interface may be connected with a camera capturing surroundings of the seat. The processor may open the door when the occupant's undressing is detected via the camera.

The driving state information for the vehicle may include at least one of a remaining driving time, destination information, driving route information, or an expected arrival time, and the processor may change the operation course of the supply unit when the driving state information for the vehicle is changed.

The occupant's vehicle boarding pattern may include at least one of a boarding time, boarding time, a driving distance, a driving route, or a type of clothing.

The processor may receive weather information via the interface and control the operation course of the supply unit based on the weather information.

The interface may be connected with a communication unit transmitting and receiving information to/from an outside of the vehicle and a camera capturing surroundings of the seat. The processor may receive clothing treatment information for first clothing via the communication unit and control the operation course of the supply unit based on the clothing treatment information when the first clothing is detected via the camera.

According to another embodiment of the disclosure, a clothing treatment device installed in a vehicle having seats comprises a clothing receiving unit including a base plate and a side wall extending from the base plate and forming an internal space, the clothing receiving unit installed on a seat in the vehicle, a door coupled to the clothing receiving unit and opening and closing the internal space, and a supply unit supplying hot air or steam to the internal space. The clothing receiving unit may rotate or slide on the seat.

The seat may include a seat base and a backrest connected with the seat base and having an elongate hole, and the clothing receiving unit may be positioned in the hole.

The base plate may be rendered to face the seat base as the clothing receiving unit slides.

The seat may include a guide rail installed in the hole and facing the side wall. The clothing receiving unit may include a slide installed on an outer surface of the side wall and engaged with the guide rail.

The seat may include a first seat including a first seat base and a first backrest connected with the first seat base, a second seat including a second seat base positioned on a side of the first seat base and a second backrest connected with the second seat base and positioned on a side of the first backrest, and a second hole including a first part formed in the first backrest and a second part formed in the second backrest and communicating with the first part, and wherein the clothing receiving unit is positioned in the second hole.

The seat may include a third seat and a fourth seat positioned on a side of the third seat. The clothing receiving unit may be positioned between the third seat and the fourth seat.

The seat may include a door positioned on a side of the third seat. The base plate may be rendered to face the door as the clothing receiving unit slides.

The seat may include a seat base and a backrest positioned behind the seat base and connected with the seat base. The clothing receiving unit may be installed on a rear surface of the backrest.

The base plate may face the backrest.

The clothing treatment device may further comprise a hinge coupled to the side wall and the backrest.

Advantageous Effects

The effects of the control device according to the disclosure are as follows.

According to at least one of the embodiments of the disclosure, it is possible to provide a clothing treatment device installed in a vehicle.

According to at least one of the embodiments of the disclosure, it is possible to provide a clothing treatment device activated according to a predetermined condition.

According to at least one of the embodiments of the disclosure, it is possible to provide a clothing treatment device that controls an operation course according to a predetermined condition.

DESCRIPTION OF DRAWINGS

FIG. 1 illustrates an exterior of a vehicle having a clothing treatment device according to an embodiment of the disclosure;

FIG. 2 is an internal block diagram illustrating a vehicle;

FIGS. 3 to 7 illustrate embodiments of a clothing treatment device according to the disclosure;

FIG. 8 is an internal block diagram illustrating a clothing treatment device according to an embodiment of the disclosure; and FIGS. 9 to 31 are views illustrating embodiments of a clothing treatment device according to an embodiment of the disclosure.

MODE OF INVENTION

Hereinafter, embodiments of the disclosure are described in detail with reference to the accompanying drawings. The same references may be used to denote the same or similar elements throughout the drawings and the specification, and no duplicate description is given of the elements. As used herein, the terms "module" and "unit" are provided solely for ease of description and these terms may be used interchangeably but rather than being distinct in meaning or role. When determined to make the subject matter of the disclosure unclear, the detailed description of the known art or functions may be skipped. The accompanying drawings are provided merely for a better understanding of the disclosure and the technical spirit or the scope of the disclosure are not limited by the drawings.

The terms coming with ordinal numbers such as 'first' and 'second' may be used to denote various components, but the components are not limited by the terms. The terms are used to distinguish one component from another.

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when a component is "directly connected to" or "directly coupled to" another component, no other intervening components may intervene therebetween.

As used herein, the singular forms "a," "an," and "the" are intended to include the plural forms as well, unless the context clearly indicates otherwise.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, 'vehicle' is a concept encompassing a car and a motorcycle. The following description focuses primarily on a car.

The vehicle described herein may be a concept encompassing all of internal combustion engine vehicles having an engine as a power source, hybrid vehicles having an engine and an electric motor as power sources, and electric vehicles having an electric motor as a power source.

In the following description, the left side of the vehicle means the left side of the driving direction of the vehicle, and the right side of the vehicle means the right side of the driving direction of the vehicle.

Unless otherwise mentioned herein, left hand drive (LHD) vehicles are mainly described.

Hereinafter, the terms "user," "driver," "occupant," and "passenger" may be used interchangeably according to embodiments.

In the following description, the clothing treatment device 400 is a separate device provided in the vehicle 700 and may exchange information necessary for data communication with the vehicle 700. However, the clothing treatment device 400 may include at least some of the units of the vehicle 700. The clothing treatment device 400 may be referred to as a clothing manager 400, a styler 400, a control device 400, a vehicle controller 400, a vehicle auxiliary device 400, or an auxiliary device 400.

Alternatively, at least some of the clothing treatment device 400 may be units of the vehicle 700 or another device mounted to the vehicle 700. Further, it may be understood that these external units are included in the clothing treatment device 400 by transmitting and receiving data through the interface unit of the clothing treatment device 400.

Referring to FIG. 1, the vehicle 700 may include wheels 13FL and 13RL rotated by a power source and the clothing treatment device 400.

Referring to FIG. 2, the vehicle may include a communication unit 710, an input unit 720, a sensing unit 760, an output unit 740, a vehicle driving unit 750, a memory 730, an interface unit 780, and a control unit 770, a power supply unit 790, a control device 100, and an AVN device 300. The communication unit 710 may include one or more modules that enable wireless communication between the vehicle and a mobile terminal 600, between the vehicle and an external server 500, or between the vehicle and another vehicle 510. Further, the communication unit 710 may include one or more modules for connecting the vehicle to one or more networks.

The communication unit 710 may include a broadcast reception module 711, a wireless Internet module 712, a short-range communication module 713, a location information module 714, and an optical communication module 715.

The broadcast reception module 711 receives broadcast signals or broadcast-related signals from an external broadcast management server via a broadcast channel. Here, the broadcast includes radio broadcast or TV broadcast.

The wireless Internet module 712 refers to a module for wireless Internet access, and may be mounted inside or outside the vehicle. The wireless Internet module 712 is configured to transmit and receive wireless signals over a communication network according to wireless Internet technology.

The wireless Internet technology includes, e.g., WLAN (Wireless LAN), Wi-Fi (Wireless-Fidelity), Wi-Fi (Wireless Fidelity) direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), or the wireless Internet module 712 transmits and receives data according to at least one wireless Internet technology in the scope encompassing Internet technologies even not enumerated above. For example, the wireless Internet module 712 may wirelessly exchange data with the external server 500. The wireless Internet module 712 may receive weather information and road traffic condition information (e.g., Transport Protocol Expert Group (TPEG)) information from the external server 500.

The short-range communication module 713 may be intended for short-range communication and may support short-range communication using at least one of Bluetooth™, radio frequency identification (RFID), infrared data association (IrDA), ultra-wideband (UWB), ZigBee, near-field communication (NFC), wireless-fidelity (Wi-Fi), Wi-Fi Direct, or wireless universal serial bus (USB) technology.

The short-distance communication module 713 may form a short-range wireless area network to perform short-range communication between the vehicle and at least one external device. For example, the short-range communication module 713 may wirelessly exchange data with the mobile terminal 600. The short-range communication module 713 may receive weather information and road traffic condition information (e.g., Transport Protocol Expert Group (TPEG)) from the mobile terminal 600. For example, when the user is aboard the vehicle, the user's mobile terminal 600 and the vehicle may pair with each other automatically or by executing the user's application.

The location information module 714 is a module for acquiring the location of the vehicle, and a representative example thereof is a Global Positioning System (GPS) module. For example, if the vehicle utilizes a GPS module, the vehicle's location may be obtained using a signal transmitted from a GPS satellite.

The optical communication module 715 may include a light transmitter and a light receiver.

The light receiver may convert a light signal into an electric signal to receive information. The light receiver may include a photodiode (PD) for receiving light. The photodiode may convert light into an electrical signal. For example, the light receiver may receive information for the vehicle ahead through the light emitted from a light source included in the vehicle ahead.

The light transmitter may include at least one light emitting device for converting an electrical signal into an optical signal. Here, the light emitting device is preferably a light emitting diode (LED). The light transmitter converts the electrical signal into an optical signal and transmits it to the outside. For example, the light transmitter may emit the optical signal to the outside by blinking the light emitting device corresponding to a predetermined frequency. According to an embodiment, the light transmitting unit may include a plurality of light emitting device arrays. According to an embodiment, the light transmitter may be integrated with a lamp provided in the vehicle. For example, the light transmitter may be at least one of the headlamps, tail lamps, brake lamps, turn indicators, and vehicle width lamps. For example, the optical communication module 715 may exchange data with another vehicle 510 through optical communication.

The input unit 720 may include a driving operation means 721, a camera 195, a microphone 723, and a user input unit 724.

The driving operation means 721 receives a user input for driving the vehicle. The driving operation means 721 may include a steering input means, a shift input means, an acceleration input means, and a brake input means.

The camera 722 may include an image sensor and an image processing module. The camera 722 may process still images or moving images obtained by an image sensor (e.g., CMOS or CCD). The image processing module may process the still image or moving image obtained through the image sensor, extract necessary information, and transmit the extracted information to the control unit 770. Meanwhile, the vehicle may include a camera 722 that captures in front or around the vehicle, and a monitoring unit 725 that captures the inside of the vehicle.

The monitoring unit 725 may obtain an image of the occupant. The monitoring unit 725 may obtain an image for biometric recognition of the occupant.

The microphone 723 may process an external sound signal into electrical data. The processed data may be utilized in various ways depending on the function being performed in the vehicle. The microphone 723 may convert the user's voice command into electrical data. The converted electrical data may be transmitted to the control unit 770. The microphone 723 may be referred to as a mic 723.

Meanwhile, according to an embodiment, the camera 722 or the microphone 723 may be a component included in the sensing unit 760, but not included in the input unit 720.

The user input unit 724 is one for receiving information from the user. When information is input through the user input unit 724, the control unit 770 may control the operation of the vehicle to correspond to the input information. The user input unit 724 may include a touch input means or a mechanical input means. According to an embodiment, the user input unit 724 may be disposed in one area of the steering wheel. In this case, the driver may manipulate the user input unit 724 with his finger while holding the steering wheel.

The sensing unit 760 senses a signal related to driving of the vehicle. To this end, the sensing unit 760 may include a collision sensor, a wheel sensor, a speed sensor, an inclination sensor, a weight sensor, a heading sensor, a yaw sensor, a gyro sensor, a position module, a vehicle moving forward/backward sensor, a battery sensor, a fuel sensor, a tire sensor, a steering sensor by steering wheel rotation, an in-vehicle temperature sensor, an in-vehicle humidity sensor, an ultrasonic sensor, a radar, and a lidar.

Accordingly, the sensing unit 760 may obtain sensing signals for, e.g., vehicle collision information, vehicle direction information, vehicle location information (GPS information), vehicle angle information, vehicle speed information, vehicle acceleration information, vehicle inclination information, vehicle moving forward/backward information, battery information, fuel information, tire information, vehicle lamp information, in-vehicle temperature information, in-vehicle humidity information, and steering wheel rotation angle.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crank angle sensor (CAS).

The sensing unit 760 may include a biometric information detection unit. The biometric information detection unit detects and obtains biometric information for the passenger. Biometric information may include fingerprint recognition (Fingerprint) information, iris recognition (Iris-scan) information, retina-scan information, hand geo-metry information, facial recognition information, and voice recognition information. The biometric information detection unit may include a sensor for sensing the passenger's biometric information. Here, the monitoring unit 725 and the microphone 723 may operate as sensors. The biometric information detection unit may obtain hand shape information and face recognition information through the monitoring unit 725.

The output unit 740 is one for outputting information processed by the control unit 770, and may include a display unit 741, a sound output unit 742, and a haptic output unit 743.

The display unit 741 may display information processed by the control unit 770. For example, the display unit 741 may display vehicle-related information. Here, the vehicle-related information may include vehicle control information for direct control of the vehicle, or vehicle driving assistance information for guiding the driver. The vehicle-related information may also include vehicle state information indicating the current state of the vehicle or vehicle driving information related to the driving of the vehicle.

The display unit 741 may include at least one of a liquid crystal display (LCD), a thin film transistor-liquid crystal display (TFT-LCD), an organic light-emitting diode (OLED), a flexible display, a three-dimensional (3D) display, or an e-ink display.

The display unit 741 may be layered or integrated with a touch sensor, implementing a touchscreen. Such a touch screen may function as the user input unit 724 that provides an input interface between the vehicle and the user, and may provide an output interface between the vehicle and the user. In this case, the display unit 741 may include a touch sensor for detecting a touch on the display unit 741 to receive a control command input by a touch method.

Using this, when a touch is made to the display unit 741, the touch sensor may detect the touch, and the control unit 770 may generate a control command corresponding to the touch based thereon. The content input by the touch method may be letters or numbers, or menu items that may be instructed or designated in various modes.

The touch sensor and proximity sensor may sense various types of touches, such as short (or tap) touches, long touches, multi-touch, drag touches, flick touches, pinch-in touches, pinch-out touches, swipe touches, or hovering touches on the touch screen, alone or in combination. Hereinafter, the term "touch" or "touch input" may be used to collectively refer to the aforementioned various types of touch.

Meanwhile, the display unit 741 may include a cluster so that the driver may identify vehicle state information or vehicle driving information simultaneously with driving. The cluster may be located on the dashboard. In this case, the driver may identify the information displayed on the cluster while keeping his gaze in front of the vehicle.

Meanwhile, according to an embodiment, the display unit 741 may be implemented as a Head Up Display (HUD). When the display unit 741 is implemented as a HUD, information may be output through a transparent display provided on the windshield. Alternatively, the display unit 741 may include a projection module to output information through an image projected on the windshield.

The sound output unit 742 converts the electrical signal from the control unit 770 into an audio signal and outputs it. To this end, the sound output unit 742 may include a speaker or the like. The sound output unit 742 may output a sound corresponding to the operation of the user input unit 724.

The haptic output unit 743 generates a tactile output. For example, the haptic output unit 743 may vibrate a steering wheel, a seat belt, and a seat so that the user may recognize the output.

The vehicle driving unit 750 may control operations of various vehicle devices. The vehicle driving unit 750 may include a power source driving unit 751, a steering driving unit 752, a brake driving unit 753, a lamp driving unit 754, an air conditioning driving unit 755, a window driving unit 756, an airbag driving unit 757, a sunroof driving unit 758, and a suspension driving unit 759.

The power source driving unit 751 may perform electronic control on the power source in the vehicle. For example, when a fossil fuel-based engine (not shown) is a power source, the power source driving unit 751 may perform electronic control on the engine. Thereby, the output torque of the engine may be controlled. When the power source driving unit 751 is an engine, the speed of the vehicle may be limited by limiting the engine output torque under the control of the control unit 770. As another example, when an electric motor (not shown) is a power source, the power source driving unit 751 may control the motor. Thereby, the rotation speed, torque, etc. of the motor may be controlled.

The steering driving unit 752 may perform electronic control on a steering device in the vehicle. Thereby, the traveling direction of the vehicle may be changed.

The brake driving unit 753 may perform electronic control on a brake device (not shown) in the vehicle. For example, the speed of the vehicle may be reduced by controlling the operation of a brake disposed on the wheel. As another example, the traveling direction of the vehicle may be adjusted to the left or right by changing the operation of the brakes individually disposed on the left wheel and the right wheel.

The lamp driving unit 754 may control the turn-on/off of a lamp disposed inside or outside the vehicle. The lamp driving unit 754 may also control the intensity and direction of the light of the lamp. For example, the lamp driving unit 754 may control, e.g., a direction indicator or a brake lamp.

The air conditioning driving unit 755 may perform electronic control on an air conditioner (not shown) in the vehicle. For example, when the temperature inside the vehicle is high, the air conditioner may be operated to control to allow cooling air to be supplied to the inside of the vehicle.

The window driving unit 756 may perform electronic control on a window device in the vehicle. For example, the window driving unit 756 may control the opening or closing of the left and right windows of the vehicle.

The airbag driving unit 757 may perform electronic control on an airbag device in the vehicle. For example, in case of danger, the airbag driving unit 757 may control to allow the airbag to deploy.

The sunroof driving unit 758 may perform electronic control on a sunroof device (not shown) in the vehicle. For example, the sunroof driving unit 758 may control the opening or closing of the sunroof.

The suspension driving unit 759 may perform electronic control on a suspension device (not shown) in the vehicle. For example, when there is a bump on the road surface, the suspension driving unit may control the suspension device to reduce vehicle vibrations.

The memory 730 is electrically connected to the control unit 770. The memory 770 may store basic data for the units, control data for controlling the operation of the units, and input/output data. The memory 790 may be a variety of hardware storage devices, such as ROM, RAM, EPROM, flash drive, hard drive, and the like. The memory 730 may store various data for the overall operation of the vehicle, such as a program for processing or controlling the control unit 770.

The interface unit 780 may serve as a passage with various types of external devices connected to the vehicle. For example, the interface unit 780 may have a port connectable to the mobile terminal 600, and may be connected to the mobile terminal 600 through the port. In this case, the interface unit 780 may exchange data with the mobile terminal 600.

Meanwhile, the interface unit 780 may serve as a passage for supplying electrical energy to the connected mobile terminal 600. When the mobile terminal 600 is electrically connected to the interface unit 780, the interface unit 780 provides the electric energy supplied from the power supply unit 790 to the mobile terminal 600 under the control of the control unit 770.

The control unit 770 may control the overall operation of each unit in the vehicle. The control unit 770 may be referred to as an Electronic Control Unit (ECU).

The control unit 770 may execute a function corresponding to the transmitted signal according to the transmission of the execution signal of the control device 100.

When implemented in hardware, the control unit 770 may be implemented using at least one of ASICs (application specific integrated circuits), DSPs (digital signal processors), DSPDs (digital signal processing devices), PLDs (programmable logic devices), FPGAs (field programmable gate arrays), processors, controllers, micro-controllers, microprocessors, or electrical units for performing other functions.

The power supply unit 790 may supply power required for operation of each component under the control of the control unit 770. In particular, the power supply unit 770 may receive power from a battery inside the vehicle.

The AVN (Audio Video Navigation) device 300 may exchange data with the control unit 770. The control unit 770 may receive navigation information from the AVN device 300 or a separate navigation device. Here, the navigation information may include set destination information, route information according to the destination, map information related to vehicle driving, or vehicle location information.

The clothing treatment device 100 may be a refresher that refreshes clothes. However, without limitations thereto, the spirit of the disclosure may be applied to other devices that may include a heat pump. Here, the term "refresh" refers to supplying or providing air or heated air (hereinafter, collectively referred to as 'hot air' for convenience) or water, mist, or steam (hereinafter, collectively referred to as 'steam' for convenience) to the clothes to thereby remove wrinkles, deodorize, sanitize, prevent static electricity, or warm the clothes. Further, the clothing referred to herein includes not only clothes and apparel but also objects that may be worn by a person, such as shoes, socks, gloves, hats, and scarves, as well as objects used by the person, such as dolls, towels, and blankets, and encompasses all objects that may be washed.

Referring to FIG. 3, the clothing treatment device 100 according to an embodiment may include a cabinet 10 in which clothes are received. The cabinet 10 forms the exterior of the clothing treatment device 100. The cabinet 10 may be referred to as a clothing receiving unit 10. A receiving space 12 in which clothes are received may be provided in the cabinet 10. The receiving space 12 may be referred to as an internal space 12. The receiving space 12 may be provided with a hanger 20 to hold clothes to thereby maximize the effect when steam and hot air are supplied, as described below. It is possible to prevent wrinkles by hanging clothes on the hanger 20 instead of folding and storing them, and it is possible to enhance the refreshing effect when steam or hot air is supplied. A moisture generator for supplying steam to the inside of the receiving space 12 may be provided in a predetermined position of the cabinet 10. Although not illustrated in the drawings, the moisture generator may include a predetermined housing for storing water or passing water and a heater for heating the water inside the housing. Accordingly, it is possible to supply steam by heating water by the heater. Since the steam supplied by the moisture generator is high temperature, it tends to rise. Accordingly, when steam is supplied to the receiving space 12 by the moisture generator, the moisture generator may be provided below the receiving space 12. In the drawing, a space between the bottom of the receiving space 12 and the cabinet 10 forms a machine room, and the moisture generator may be provided in the machine room. The moisture generator may supply steam from the lower portion of the receiving space 12 toward the clothes.

A hot air generator for supplying hot air to the receiving space 12 may be provided in the machine room. The hot air generator may supply hot air to the receiving space 12. Since the hot air supplied from the hot air generator is also relatively high temperature, if the hot air generator is provided in the machine room located below the receiving space 12, the supplied hot air may be smoothly supplied to the receiving space 12 at the top. The specific configuration of the hot air generator may be implemented in various ways. For example, a fan is provided to supply air, or the air is heated by a heater or the like, and moisture in the air is removed by a dehumidifying unit to thereby supply dry heated air. Further, the hot air generator may be connected to the receiving space 12 via a circulation duct (not shown). In this case, the air discharged from the receiving space 12 is heated and/or dehumidified and supplied again, or air is sucked from the outside to generate and supply dry heated air, and the air in the receiving space 12 is discharged back to the outside. The moisture generator and the hot air generator may be collectively referred to as a supply unit.

The clothing treatment device 100 may include a movable nozzle device 30 capable of supplying steam and/or hot air generated by the moisture generator or the hot air generator to the receiving space 12. Specifically, the movable nozzle device 30 may be movably provided in the receiving space 12. In other words, since the movable nozzle device 30 supplies steam and/or hot air toward the clothes, it may be provided to be movable along the clothes. Since the clothes are hung on the hanger 20 in the inside of the receiving space 12, the movable nozzle device 30 may be provided to be capable of linearly moving up and down in the vertical direction along the clothes, inside the receiving space 12.

Furthermore, the movable nozzle device 30 may be provided to be capable of rotation as well as linear movement up and down in the receiving space 12. In other words, the movable nozzle device 30 may be provided to be able to rotate at a predetermined angle around the clothes while moving up and down. This is so done because some clothes may be damaged if steam is supplied from an adjacent position. Accordingly, the movable nozzle device 30 may be provided to adjust the distance from the clothes by rotation. Further, if the movable nozzle device 30 rotates while linearly moving up and down, the distance from the clothes is continuously changed, preventing damage to the clothes and allowing for effective supply of steam and/or hot air.

FIG. 4 is a perspective view illustrating the movable nozzle device 30, and FIG. 5 is a rear view illustrating the movable nozzle device 30. The movable nozzle device 30 may include a nozzle body 32 which is provided to be capable of linearly moving up and down in the receiving space 12. A guide bar 34 may be provided in the receiving space 12 to guide the movement of the nozzle body 32.

The nozzle body 32 may be movably provided along the guide bar 34. In this case, the guide bar 34 may be provided vertically inside the receiving space 12. Accordingly, the nozzle body 32 may be provided to be capable of linearly moving up and down along the guide bar 34 in the receiving space 12. The configuration in which the nozzle body 32 is movable along the guide bar 34 may be implemented in various ways. For example, a motor (not shown) is provided on the nozzle body 32, a pinion is provided on the rotation shaft of the motor, and a rack corresponding to the pinion is provided on the guide bar 34, so that the nozzle body 32 may be moved up and down by the driving of the motor. Further, a pair of pulleys are provided on the top and bottom of the guide bar 34, the pulleys and the nozzle body are connected by a chain, and any one of the pair of pulleys is driven by the motor to move the nozzle body 32.

The movable nozzle device 30 is provided to rotate at a predetermined angle around the nozzle body 32 and may include at least one nozzle arm 40 and 44 for selectively supplying at least one of moisture and hot air. The nozzle arms 40 and 44 may be provided to the nozzle body 32 to rotate at a predetermined angle. The nozzle arms 40 and 44 may include at least one steam spray hole 50 for spraying steam and/or at least one hot air supply hole 52 for supplying hot air. The steam spray hole 50 may be connected to the moisture generator via, e.g., a hose (not shown), to supply steam. The hot air supply hole 52 may likewise be connected to the hot air generator by a hose or the like. The hose may be connected to the nozzle arms 40 and 44 via the nozzle body 32. Since the nozzle body 32 is provided to be movable along the guide bar 34, the hose connected to the nozzle arms 40 and 44 may be formed of a flexible material or a bellows. Accordingly, even when the nozzle body 32 moves, the hose may be connected to the nozzle arms 40 and 44 along the nozzle body 32. Also, the pair of nozzle arms 40 and 44 may be provided to the nozzle body 32 to rotate at a predetermined angle by a rotation unit 36. The rotation unit 36 may be provided to rotate around the nozzle body 32, and the nozzle arms 40 and 44 may be provided at the ends of the rotation unit 36. Accordingly, the pair of nozzle arms 40 and 44 are provided at the ends of the rotation unit 36 and may thus be rotated symmetrically. For example, the rotation unit 36 may be rotatably provided on the nozzle body 32 by a bearing (not shown) or the like. The rotation unit 36 may be rotated by a driving unit, such as a motor. Further, not only the rotation unit 36 rotates, but also the nozzle arms 40 and 44 may be rotatably provided at the end of the rotation unit 36 by a bearing or the like. In other words, when the rotation unit 36 rotates, the nozzle arms 40 and 44 may also rotate on the rotation unit 36 so that the steam spray hole 50 and the hot air supply hole 52 of the nozzle arms 40 and 44 remain directed to the clothes. When the nozzle arms 40 and 44 rotate, the nozzle arms 40 and 44 may approach the clothes within a predetermined distance or less. When the nozzle arms 40 and 44 approach the clothing within the predetermined distance or less, the nozzle arms 40 and 44 may come into contact with the clothes depending on the volume and type of the clothes. Accordingly, the nozzle arms 40 and 44 may include a plurality of rotatable ball members 54. The ball members 54 may be provided to at least partially protrude from the surface of the nozzle arms 40 and 44. Therefore, when the nozzle arms 40 and 44 rotate and come into contact with clothes, the nozzle arms 40 and 44 may smoothly be moved by the ball members 54, and the clothes may be prevented from damage due to contact of the nozzle arms 40 and 44.

Further, when the nozzle arms 40 and 44 come into contact with the clothes, the ball member 54 may compress the clothes and provide such an effect as if the clothes are ironed.

Although it is described above that at least one of steam or hot air is supplied by the movable nozzle device 30 which is movable inside the receiving space 12, it is alternatively possible to supply steam and hot air by a stationary nozzle device as well. In this case, the so-called stationary nozzle device (hereinafter, referred to as a 'first nozzle device') may be provided in a predetermined position in the receiving space 12. In particular, the first nozzle device may be provided to face the clothes from the inner wall of the receiving space 12. Accordingly, the control unit may select the movable nozzle device 30, which is movable, or the first nozzle device 130, which is stationary, and supply at least one of steam and hot air. For example, either the movable nozzle device 30 or the stationary first nozzle device 130 may be selected according to a selected course, and at least one of steam and hot air may be supplied. Alternatively, either the movable nozzle device 30 or the stationary first nozzle device 130 may be selected by the user's selection, and at least one of stream and hot air may be supplied.

If steam is applied towards the clothes, the clothes may get wet. Further, in the case of drying clothes, which have not been completely dried after washing, using the clothing treatment device 100 according to the present embodiment, the clothes may contain a predetermined amount of moisture. Accordingly, the clothing treatment device 100 according to the present embodiment may have a component for removing moisture from the clothes which contain moisture. To that end, various components may be available, and the above-described hot air generator may be a component to remove moisture. In other words, if dry hot air is supplied by the hot air generator, moisture in clothes may be removed. The clothing treatment device 100 according to the present embodiment may have a component for removing moisture contained in clothes in addition to the hot air generator.

FIG. 6 is a front view illustrating a clothes hanger 20 provided in the receiving space of the clothing treatment device 100 according to an embodiment, and FIG. 7 is a view illustrating a state in which an extension is formed downward in FIG. 6. The clothing treatment device 100 according to an embodiment includes a clothes hanger 20 provided in the receiving space 12 of the cabinet 10 to hold clothes and generate vibrations. The clothes hanger 20 may include a wing portion 22 on which clothes are supported. The wing portion 22 serves to support the clothes. A body portion 24 may be provided under the wing portion 22. The body portion 24 serves to support the clothes inside the clothes. An extension 26 which may be extended optionally may be provided under the body portion 24. The extension 26 serves to support the lower portion of long clothes. The extension 26 may be manually extended by the user or automatically by a motor or the like. As illustrated in FIG. 5, for relatively long clothes, the user may extend the extension 26 and hang the clothes thereon, thereby supporting the lower portion of the clothes on the extension 26. The clothes hanger 20 may serve not only to hang the clothes, but also to vibrate the clothes. In other words, when the clothes hung on the clothes hanger 20 contain a predetermined amount of moisture, the moisture contained in the clothes may be removed by vibrating the clothes. Therefore, the clothes hanger 20 according to an embodiment may include a vibration generating means for generating vibration. The clothes hanger 20 may include at least one vibration pad 28 as a vibration generating means. The vibration pad 28 may be provided on the body portion 24. The vibration pad 28 may have a vibration generating source for generating vibration therein, thereby radiating the vibration toward the outside. Accordingly, when the clothes are hung on the clothes hanger, the control unit may vibrate the clothes by the vibration pad 28 to remove moisture from the clothes. Meanwhile, the control unit may automatically control the vibration pad to operate when steam is supplied by the nozzle device or may drive the vibration pad by the user's manipulation. Meanwhile, the clothing treatment device 100 according to the present embodiment may further include a second nozzle device 230 that directly supplies steam and/or hot air to the clothes hanger 20. In other words, when clothes are hung on the clothes hanger 20, steam and/or hot air may be directly supplied from the clothes hanger 20 to the clothes. When the clothes hanger 20 supplies steam and/or hot air, it is supplied toward the clothes from a relatively short distance, so that the refreshing and drying effects by the steam and hot air may be maximized. The second nozzle device 230 may be provided on a predetermined portion of the hanger 20, and may be provided on the wing portion 22. When the second nozzle device 230 is provided on the clothes hanger 20, since the moisture generator and the hot air generator are provided in the cabinet 10, a component for connecting the moisture generator and hot air generator with the second nozzle device 230 is required. Accordingly, the clothes hanger 20 may include a connection part 120 on the top of the wing portion 22. Further, a supply unit (not shown) corresponding to the connection part 120 may be provided at an upper portion of the receiving space 12 of the cabinet 10. The connection part 120 may be detachably coupled to the supply unit by a hook or the like. The connection part 120 may include a first steam supply port 122 and/or a first hot air supply port 124 connected to the second nozzle device 230, and the supply unit may include a second steam supply port (not shown) connected to the steam generator and/or a second hot air supply port (not shown) connected with the hot air generator. Therefore, when the connection part 120 of the clothes hanger 20 is connected to the supply unit of the cabinet 10, the first steam supply port 122 and the second steam supply port are connected, and the first hot air supply port 124 and the second hot air supply port are connected. Thus, the steam generated by the steam generator may be supplied to the second nozzle device 230 through the second steam supply port and the first steam supply port 122, and the hot air generated by the hot air generator may be supplied to the second nozzle device 230 through the second hot air supply port and the first hot air supply port 124.

Referring to FIG. 8, the clothing treatment device 400 may include at least one of an input unit 410, a communication unit 420, an interface unit 430, a memory 440, a camera 460, a sensor unit 450, a processor 470, a display unit 480, an audio output unit 485, and a power supply unit 490. The clothing treatment device 400 may have more or fewer components than those listed above. Among the units included in the clothing treatment device 400 and the units included in the vehicle 700, units with the same names may be included in the vehicle 700 or the clothing treatment device 400.

The clothing treatment device 400 may include an input unit 410 that detects the user's input. For example, the user may input settings for clothing treatment functions provided by the clothing treatment device 400 or power on/off the clothing treatment device 400 through the input unit 410.

The input unit 410 may include at least one of a gesture input unit (e.g., an optical sensor) for detecting the user's gesture, a touch input unit for detecting the user's touch (e.g., a touch sensor, a touch key, and a push key (mechanical key)), and a microphone for detecting the user's voice input.

The clothing treatment device 400 may include a communication unit 420 that communicates with another vehicle 510, a terminal 600, and a server 500.

The clothing treatment device 400 may receive communication information including at least one of navigation information, driving information for the other vehicle 510 and traffic information through the communication unit 420. The clothing treatment device 400 may transmit information for the vehicle 700 through the communication unit 420.

The communication unit 420 may receive at least one of location information, weather information, and road traffic information (e.g., Transport Protocol Expert Group (TPEG), etc.) from the mobile terminal 600 and/or the server 500.

Further, the communication unit 420 may receive traffic information from the server 500 equipped with an intelligent traffic system (ITS). Here, the traffic information may include traffic signal information, lane information, around-vehicle information, or location information.

The communication unit 420 may transmit navigation information from the server 500 and/or the mobile terminal 600. Here, the navigation information may include at least one of map information related to vehicle driving, lane information, vehicle location information, set destination information, and route information according to the destination.

For example, the communication unit 420 may receive the real-time location of the vehicle as navigation information. Specifically, the communication unit 420 may obtain the location of the vehicle by including a Global Positioning System (GPS) module and/or a Wireless Fidelity (Wi-Fi) module.

Further, the communication unit 420 may receive the driving information for the other vehicle 510 from the other vehicle 510 and transmit the information for the vehicle to share the driving information between the vehicles. Here, the shared driving information may include at least one of vehicle traveling direction information, location information, vehicle speed information, acceleration information, movement path information, moving forward/backward information, neighbor vehicle information, and turn signal information.

Further, when the user is aboard the vehicle, the user's mobile terminal 600 and the clothing treatment device 400 may pair with each other automatically or by the user executing an application.

The communication unit 420 may wirelessly exchange data with the other vehicle 510, the mobile terminal 600, or the server 500. The communication unit 420 may perform wireless communication using a wireless data communication scheme. As the wireless data communication scheme, mobile communication standards or communication schemes (e.g., global system for mobile communication (GSM), code division multiple access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), or LTE-advanced (LTE-A) may be used.

The communication unit 420 may use wireless Internet technology, e.g., WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), or LTE-A (Long Term Evolution-Advanced).

The communication unit 420 may use short-range communication, and support short-range communication using at least one of Bluetooth™, radio frequency identification (RFID), infrared data association (IrDA), ultra-wideband (UWB), ZigBee, near-field communication (NFC), wireless-fidelity (Wi-Fi), Wi-Fi Direct, or wireless universal serial bus (USB) technology.

Further, the clothing treatment device 400 may use a short-distance communication scheme to pair with a mobile terminal inside the vehicle and may use the long-range wireless communication module of the mobile terminal to wirelessly exchange data with the other vehicle 510 or the server 500.

The clothing treatment device 400 may include an interface unit 430 that receives data of the vehicle 700 or transmits signals processed or generated by the processor 470 to the outside.

The clothing treatment device 400 may receive at least one of driving information for other vehicles, navigation information, and sensor information through the interface unit 130.

The clothing treating device 400 may transmit a control signal for executing a clothing treating function or information generated by the clothing treating device 400 to the controller 770 of the vehicle through the interface unit 430. To this end, the interface unit 430 may perform data communication with at least one of the control unit 770, the AVN (Audio Video Navigation) device 300 and the sensing unit 760 inside the vehicle by a wired communication or wireless communication scheme. The interface unit 430 may receive navigation information through data communication with the controller 770, the AVN device 300, and/or a separate navigation device. The interface unit 430 may receive sensor information from the control unit 770 or the sensing unit 760.

The sensor information may include at least one of direction information, location information, vehicle speed information, acceleration information, inclination information, moving forward/backward information, fuel information, distance information between the vehicle ahead and the vehicle behind, vehicle-lane distance information, and turn signal information for the vehicle 700.

The sensor information may be obtained from a heading sensor, a yaw sensor, a gyro sensor, a position module, a vehicle moving forward/backward sensor, a wheel sensor, a vehicle speed sensor, a vehicle body inclination sensor, a battery sensor, a fuel sensor, a tire sensor, a steering sensor by steering wheel rotation, an in-vehicle temperature sensor, an in-vehicle humidity sensor, a door sensor, and the like. Meanwhile, the position module may include a GPS module for receiving GPS information.

The interface unit 430 may receive the user input received through the user input unit 110 of the vehicle. The interface unit 130 may receive the user input from the input unit of the vehicle or may receive the user input via the control unit 770. In other words, if the input unit is disposed, as a component, inside the vehicle, the user input may be received through the interface unit 430.

The interface unit 430 may receive traffic information obtained from the server 500. The server 500 may be a server located in a traffic control center that controls traffic. For example, when traffic information is received from the server 500 through the communication unit 710 of the vehicle 700, the interface unit 430 may receive the traffic information from the controller 770.

Next, the memory 440 may store various data for the overall operation of the clothing treatment device 400, such as a program for processing or controlling the processor 470.

The memory 440 may also store a plurality of application programs (or applications) driven on the clothing treatment device 400 and data and commands for operation of the clothing treatment device 400. At least some of the application programs may be downloaded from an external server via wireless communication. At least some of these application programs may exist in the memory 440 from the time of shipment of the clothing treatment device 400. The application programs may be stored in the memory 440 and driven to perform operations (or functions) of the clothing treatment device 400 by the processor 470.

Meanwhile, the memory 440 may store data for identifying objects included in an image. For example, when a predetermined object is detected from the image obtained by the camera 460, the memory 440 may store data for identifying what the object corresponds to by a predetermined algorithm. For example, the memory 440 may store data for identifying a predetermined object, such as a passenger or clothes, from an image obtained through the camera 460.

The memory 440 may include at least one type of hardware storage medium of flash memory types, hard disk types, SSD (Solid State Disk) types, SDD (Silicon Disk Drive) types, multimedia card micro types, card types of memories (e.g., SD or XD memory cards), RAMs (Random Access Memories), SRAMs (Static Random Access Memories), ROMs (Read-Only Memories), EEPROMs (Electrically Erasable Programmable Read-Only Memories), PROMs (Programmable Read-Only Memories), magnetic memories, magnetic disks, or optical discs.

The clothing treatment device 400 may be operated in relation to a web storage that performs a storage function of the memory 440 on the Internet.

The sensor unit 450 may obtain information for the internal situation of the vehicle 700. The sensor unit 450 may detect the degree of air contamination inside the vehicle 700. Alternatively, the sensor unit 450 may detect a specific substance for determining the degree of air contamination inside the vehicle 700. Alternatively, the sensor unit 450 may detect an odor inside the vehicle 700. The sensor unit 450 may include a plurality of sensors. The sensor unit 450 may be provided in an air purifier provided inside the vehicle 700. Alternatively, the air contamination level inside the vehicle 700 may be detected through the sensing unit 760 of the vehicle 700.

The camera 460 may shoot the inside of the vehicle 700. The camera 460 may shoot the surroundings of the clothing treatment device 400. Alternatively, the camera 460 may shoot the surroundings of the seat on which the clothing treatment device 400 is installed. Alternatively, the camera 460 may shoot an occupant of the vehicle 700.

The processor 470 may be referred to as a controller 470 or control unit 470. The processor 470 may detect an object around the clothing treatment device 400 through the camera 460. Alternatively, the processor 470 may detect, through the camera 460, the occupant, clothes worn by the occupant, or clothes taken off by the occupant. The processor 470 may control the operation of the clothing treatment device 400. The processor 470 may control the operation of the door or the supply unit.

Hereinafter, the clothing treatment device 400 may be used as collectively referring to the clothing treatment devices 400a, 400b, and 400c of various embodiments.

Referring to FIGS. 9 to 11, the vehicle 700 may include a first seat 910a and a second seat 920a. The first seat 910a may include a first seat base 911a and a first backrest 912a connected to the first seat base 911a. The second seat 920a may include a second seat base 921a and a second backrest 922a connected to the second seat base 921a. The second seat 920a may be positioned on one side of the first seat 910a. The first seat 910a and the second seat 920a may be spaced apart from each other. A space 930a or a hole 930a may be formed between the first seat 910a and the second seat 920a.

The clothing treatment device 400a may be installed in the space 930a or the hole 930a. The clothing treatment device 400a may include a clothing receiving unit 413a and a door 414a. The clothing receiving unit 413a may provide an internal space sa. The clothing receiving unit 413a may include a base plate 411a and a sidewall 412a. The base plate 411a may be referred to as a base 411a. The base plate 411a may have a rectangular shape. The sidewall 412a may extend from the base plate 411a. The sidewall 412a may extend along the circumference of the base plate 411a. The sidewall 412a and the base plate 411a may be integrally formed.

The door 414a may open and close the clothing receiving unit 413a. Alternatively, the door 414a may open and close the internal space sa. The door 414a may be coupled to the clothing receiving unit 413a. The door 414a may be rotatably or pivotally connected to the clothing receiving unit 413a. Alternatively, the door 414a may slide on the clothing receiving unit 413a.

The clothing treatment device 400a may slide along the hole 930a. As the clothing treatment device 400a slides, at least a portion of the clothing treatment device 400a may be positioned inside the hole 930 and the rest may be positioned outside the hole 930a. The clothing treatment device 400a may slide between the first seat 910a and the second seat 920a.

The clothing treatment device 400a may open the door 414a when the clothing receiving unit 413a is positioned outside the hole 930a. The clothing treatment device 400a may be in a state in which the door 414a has been closed when at least a portion of the clothing receiving unit 413a is located inside the hole 930a. The clothing treatment device 400a may execute the function of treating the clothes, with the door 414a closed and it positioned inside the hole 930a.

Referring to FIG. 12, the clothing treatment device 400a may slide toward the second seat 920a. The door 414a may be opened and closed toward the first seat 910a. The clothing treatment device 400a may be installed for an occupant on the first seat 910a. In this case, the clothing treatment device 400a may slide toward the second seat 920a, and an occupant seated on the first seat 910a may secure a space for using the clothing treatment device 400a.

Referring to FIGS. 13 to 15, the vehicle 700 may include a first seat 910b, a second seat 920b, and an intermediate seat 940b. The first seat 910b may include a first seat base 911b and a first backrest 912b connected to the first seat base 911b. The second seat 920b may include a second seat base 921b and a second backrest 922b connected to the second seat base 921b. The second seat 920b may be positioned on one side of the first seat 910b. The first seat 910b and the second seat 920b may be spaced apart from each other. The intermediate seat 940b may be positioned between the first seat 910b and the second seat 920b. The intermediate seat 940b may include a seat base 941b and a backrest 942b connected to the seat base 941b. The hole 930b may be formed across the first seat 910b, the second seat 920b, and the intermediate seat 940b. The hole 930b may include a first part 931b formed in the first seat 910b, a second part 933b formed in the second seat 920b, and a third part 932b formed in the intermediate seat 940b. The first part 931b, the second part 933b, and the third part 932b may communicate with each other.

The clothing treatment device 400b may be installed in the hole 930b. The clothing treatment device 400b may include a clothing receiving unit 413b and a door 414b. The clothing receiving unit 413b may provide an internal space sb. The clothing receiving unit 413b may include a base plate 411b and a sidewall 412b. The base plate 411b may be referred to as a base 411b. The base plate 411b may have a rectangular shape. The sidewall 412b may extend from the base plate 411b. The sidewall 412b may extend along the circumference of the base plate 411b. The sidewall 412b and the base plate 411b may be integrally formed.

The door 414b may open and close the clothing receiving unit 413b. Alternatively, the door 414b may open and close the internal space sb. The door 414b may be coupled to the clothing receiving unit 413b. The door 414b may be rotatably or pivotally connected to the clothing receiving unit 413b. Alternatively, the door 414b may slide on the clothing receiving unit 413b.

The clothing treatment device 400b may slide along the hole 930b. As the clothing treatment device 400b slides, at least a portion of the clothing treatment device 400b may be located inside the hole 930b, and the rest of the clothing treatment device 400b may be located outside the hole 930b.

The clothing treatment device 400b may open the door 414b when the clothing receiving unit 413b is located outside the hole 930b. The clothing treatment device 400b may be in a state in which the door 414b has been closed when at least a portion of the clothing receiving unit 413b is located inside the hole 930b. The clothing treatment device 400b may execute the function of treating the clothes, with the door 414b closed and it positioned inside the hole 930b.

Referring to FIG. 16, the slide 415 may be installed on the sidewall 412a or 412b. The slide 415 may be installed on the outer surface of the sidewall 412a or 412b. The guide rail 416 may be installed in the hole 930a or 930b. The slide 415 may be engaged to the guide rail 416. The slide 415 may be slid along the guide rail 416 while remaining engaged with the guide rail 416. A pair of slides 415 may be installed on the two opposite sidewalls 412a and 412b. A pair of guide rails 416 may be installed to correspond to the slides 415.

Referring to FIGS. 17 to 19, the clothing treatment device 400c may be installed on a seat 910c. The seat 910c may include a seat base 911c and a backrest 912c connected to the seat base 911c. The clothing treatment device 400c may be installed on the backrest 912c. The backrest 912c may include a first surface that contacts the back of the occupant and a second surface opposite the first surface. The clothing treatment device 400c may be installed on the second surface.

The clothing treatment device 400c may include a clothing receiving unit 413c and a door 414c. The clothing receiving unit 413c may provide an internal space sc. The clothing receiving unit 413c may include a base plate 411c and a sidewall 412c. The base plate 411c may be referred to as a base 411c. The base plate 411c may have a rectangular shape. The sidewall 412c may extend from the base plate 411c. The sidewall 412c may extend along the circumference of the base plate 411c. The sidewall 412c and the base plate 411c may be integrally formed.

The door 414c may open and close the clothing receiving unit 413c. Alternatively, the door 414c may open and close the internal space sc. The door 414c may be coupled to the clothing receiving unit 413c. The door 414c may be rotatably or pivotally connected to the clothing receiving unit 413c. Alternatively, the door 414c may slide on the clothing receiving unit 413c.

A hinge 417 may couple the clothing treatment device 400c to the backrest 912c. The hinge 417 may include a rotation shaft 417b and a first part 417a and a second part 417c that rotate on the rotation shaft 417b. The first part 417a may be coupled to the sidewall 412c. The second part 417c may be coupled to the backrest 912c. The clothing treatment device 400c may rotate about the rotation shaft 417b of the hinge 417. Alternatively, the clothing treatment device 400c may be rotated or pivoted about the backrest 912c.

The processor 470 may detect contamination of the clothes worn by the occupant through the camera 460. When the degree of contamination of clothes worn by the occupant is equal to or greater than a preset value, the processor 470 may activate the clothing treatment device 400.

Activation of the clothing treatment device 400 may include at least one of the following meanings. Activation of the clothing treatment device 400 may mean that the clothing receiving unit 413 slides, rotates, or pivots. Alternatively, activation of the clothing treatment device 400 may mean that the door 414 is opened. Alternatively, activation of the clothing treatment device 400 may mean that the internal space sa, sb, or sc is opened. Alternatively, activation of the clothing treatment device 400 may mean notifying the occupant that the clothing treatment device 400 may be used, via sound, image display, vibration, or the like.

The processor 470 may monitor the air contamination level inside the vehicle 700 through the sensor unit 450. The sensor unit 450 may detect an odor inside the vehicle 700. Alternatively, the sensor unit 450 may measure the concentration of a specific substance inside the vehicle 700. The concentration of a specific substance may be a criterion for determining the degree of air contamination. The processor 470 may activate the clothing treatment device 400 through the sensor unit 450 when the air contamination level inside the vehicle 700 is equal to or greater than a preset value.

The processor 470 may monitor the occupant's gesture through the camera 460. The processor 470 may activate the clothing treatment device 400 when the occupants inputs a predetermined gesture.

When an object disturbing activation of the clothing treatment device 400 is detected through the camera 460, the processor 470 may stop or pause the activation of the clothing treatment device 400. The processor 470 may resume activation of the clothing treatment device 400 when the object disturbing activation of the clothing treatment device 400 is removed. The processor 470 may rotate or move the seat, on which the clothing treatment device 400 is installed, to activate the clothing treatment device 400 when an object disturbing the activation of the clothing treatment device 400 is detected through the camera 460. The processor 470 may activate the clothing treatment device 400 after rotating or moving the seat. The processor 470 may return the rotated or moved seat to its original position when the operation of the supply unit or the refreshing of the clothes is completed.

The processor 470 may activate the clothing treatment device 400 when a person is aboard the vehicle 700.

The processor 470 may detect that the occupant undresses through the camera 460. The processor 470 may activate the clothing treatment device 400 when the occupant's undressing is detected through the camera 460.

If the air contamination level inside the vehicle 700 is greater than or equal to a preset value through the sensor unit 450 and the occupant's undressing is detected through the camera 460, the processor 470 may activate the clothing treatment device 400. When the air contamination level inside the vehicle 700 is greater than or equal to a preset value through the sensor unit 450 and the occupant's outer clothes is detected through the camera 460, the processor 470 may activate the clothing treatment device 400.

The processor 470 may control the operation of the supply unit according to any one of a plurality of operation courses. The operation course may be referred to as an operation mode, a working mode, a working course, a course, or a mode. The processor 470 may adjust the temperature of the hot air supplied by the supply unit to the internal space sa, sb, or sc, the temperature of the steam, the hot air supply time, the steam supply time, and the like according to the operation course.

For example, the plurality of operation courses may include a basic course, a simple course, a luxury clothing course, a sanitary sterilization course, a customized drying course, and the like. The basic course may include a process in which the supply unit supplies hot air or steam to the internal space sa, sb, or sc for a preset time, or the supply unit removes moisture from the internal space sa, sb, or sc. The simple course may have a relatively shorter operation time than the basic course or may lack some of the processes of the basic course. The luxury clothing course may be a course using hot air and steam of a relatively low temperature so as not to damage clothes. The sanitary sterilization course may be a course in which a hot air supply or a moisture removal process is performed to sterilize clothes. The customized drying course may be a course in which a moisture removal process is performed according to the fabric of the clothes or the degree of moisture in the clothes.

The processor 470 may control the operation course of the supply unit based on the driving state information for the vehicle 700. The driving state information for the vehicle 700 may include at least one of destination information, Estimated Time of Arrival (ETA), remaining driving time, departure point information, driving route information, driving speed, vehicle (700) direction information, vehicle (700) location information (GPS information), battery information, fuel information, tire information, in-vehicle (700) temperature information, and in-vehicle (700) humidity information.

The processor 470 may control the operation course of the supply unit based on clothes information. The processor 470 may detect the clothes received in the clothing receiving unit 413 through the camera 460. The processor 470 may detect the fabric type and color of the clothes received in the clothing receiving unit 413 and whether the clothes have an ornament, and the like.

The processor 470 may control the operation course of the supply unit based on the vehicle boarding pattern. For example, if the occupant wears a certain type of clothes at a certain time every weekday morning and moves to a certain destination, the processor 470 may provide a specific operation course at the time the passenger boards. For example, when the occupant wears a wool suit and goes to work at 8:00 a.m. every day, the processor 470 may provide an operation course for managing the wool jacket until the occupant arrives at work. As another example, when the occupant in a wool suit leaves work at a certain time every weekday evening, the processor 470 may provide an operation course for managing the wool jacket until the occupant gets back home.

The processor 470 may display operation information and control information for the clothing treatment device as an image. The processor 470 may display images on the display unit 741 or 480. The display unit 741 or 480 may be the display unit 741 provided in the vehicle 700 or the display unit 480 included in the clothing treatment device 400.

The processor 470 may control the operation course of the supply unit based on external information. The processor 470 may receive information for external weather through the communication unit 420 or the interface unit 430. The processor 470 may control the operation course of the supply unit based on external weather information. The weather information may include at least one of temperature, humidity, sunlight, snow, rain, wind volume, wind speed, and wind direction information. For example, when receiving weather information indicating that it is raining, the processor 470 may provide an operation course for drying.

Referring to FIG. 20, the processor 470 may determine whether a predetermined condition is met to activate the clothing treatment device 400 or open the door of the clothing treatment device 400 (S2010). When the predetermined condition is met, the processor may open the door 414*a* 414*b*, or 414*c* of the clothing treatment device (S2030).

Referring to FIG. 21, the processor 470 may receive the air contamination level inside the vehicle 700 (S2110). The processor 470 may determine whether the air contamination level inside the vehicle 700 is greater than or equal to a reference value (S2130). When the air contamination level inside the vehicle 700 is equal to or greater than the reference value, the processor 470 may open the door 414 of the clothing treatment device 400 (S2150).

Referring to FIG. 22, the processor 470 may detect the occupant's gesture (S2210). The processor 470 may determine whether the detected gesture matches a preset gesture (S2230). The preset gesture may be at least one of the occupant's undressing, pointing to the clothing treatment device 400, or opening the door 414 of the clothing treatment device 400. When the detected gesture matches a preset gesture, the processor 470 may open the door 414 of the clothing treatment device 400 (S2250).

Referring to FIG. 23, the processor 470 may monitor the clothing receiving unit 413 through the sensing unit 760 or 450 or the camera 722 or 460 (S2310). The processor 470 may detect whether there are clothes in the clothing receiving unit 413 through monitoring (S2330). The processor 470 may close the door 414 when clothes are detected inside the clothing receiving unit 413 (S2350).

Referring to FIG. 24, the processor 470 may monitor the surroundings of the clothing treatment device 400 through the sensing unit 760 or 450 or the camera 722 or 460 (S2410). The processor 470 may detect whether there is an obstacle around the clothing treatment device 400 through monitoring (S2430). When an obstacle is detected around the clothing treating device 400, the processor 470 may move the seat on which the clothing treating device 400 is installed from the first position to the second position (S2450).

Referring to FIG. 25, the processor 470 may determine whether the seat on which the clothing treatment device 400 is installed is in the second position (S2510). When the seat on which the clothing treatment device 400 is installed is in the second position, the processor 470 may determine whether the clothing treatment course is completed (S2530). When the clothing treatment course is completed, the processor 470 may move the seat on which the clothing treatment device 400 is installed from the second position to the first position (S2550).

Referring to FIG. 26, the processor 470 may activate, or notify the occupant of, an operation course that may be used according to the expected arrival time of the vehicle 700. The processor 470 may deactivate, or notify the occupant of, an operation course that takes longer than the expected arrival time of the vehicle 700.

Referring to FIG. 27, when the expected arrival time is changed, the processor 470 may change the operation course. When the expected arrival time is shortened, the processor 470 may change the operation course (basic course) to an operation course (simple course) that may be completed by the expected arrival time and operate the supply unit. Alternatively, when the expected arrival time is shortened, the processor 470 may notify the passenger of an operation course (simple course) that may be completed by the expected arrival time. When the expected arrival time becomes longer, the processor 470 may change the operation course from the current operation course to an operation course requiring a longer operation time and operate the supply unit. The expected arrival time may be changed to reflect driving speed, change of destination, addition of stopovers, traffic conditions, etc.

Referring to FIG. 28, the processor 400 may determine whether the driving state information for the vehicle 700 is changed (S2810). When the driving state information for the vehicle 700 is changed, the processor 400 may change the clothing treatment course based on the changed driving state information (S2830).

Referring to FIG. 29, the processor 470 may receive weather information for the outside of the vehicle 700 (S2910). The processor 470 may control the clothing treatment course based on the received weather information (S2930).

Referring to FIG. 30, the processor 470 may control the operation course of the supply unit based on external information. The processor 470 may receive information from the network 500 through the communication unit 420 or the interface unit 430. The network 500 may be a server 500. The server 500 may transmit information received from a device outside the vehicle 700 to the processor 470. The devices 100 and 102 outside the vehicle 700 may be home appliances. For example, the devices 100 and 102 outside the vehicle 700 may be the clothing treatment device 100, a washing machine, or a dryer. The processor 470 may transmit information to the server 500 through the communication unit 420 or the interface unit 430. The server 500 may transmit the information received from the processor 470 to a device outside the vehicle 700.

For example, the processor 470 may transmit/receive information from the clothing treatment device 100 outside the vehicle 700 through the server 500. The processor 470 may transmit/receive clothing treatment information from the clothing treatment device 100 installed inside a house 101. The clothing treatment information may include at least one of pieces of information for the type of operation course of the clothing treatment device 100 or 400, the progress of the operation course, the clothing management time, the condition of the clothes, the degree of washing of the clothes, the degree of drying of the clothes, the degree of contamination of the clothes, and the type of the clothes, the material of the clothes, the color of the clothes, and the like. The processor 470 may receive clothing treatment information for first clothes managed by the clothing treating device 100. When the first clothes are detected inside the vehicle 700, the processor 470 may determine an operation course of the supply unit based on the clothing treatment information received from the clothing treatment device 100. When the first clothes are managed by the clothing treatment device 100 only for part of the basic course, the processor 470 may control the supply unit so that the clothing treatment device 400 may continue the rest of the basic course.

For example, the processor 470 may receive, through the server 500, information indicating that the drying has been performed on second clothes in the dryer. When the second clothes are detected inside the vehicle 700, the processor 470 may perform a drying course based on information received from the dryer.

For example, the processor 470 may transmit clothing treatment information for third clothes to the server 500. The server 500 may transmit clothing treatment information for the third clothes to an external device. When the third clothes are detected, the external device may manage the clothes based on the clothing treatment information received from the server 500. For example, when the third clothes are managed by the clothing treatment device 400 only for part of the basic course and the clothing treatment device 100 detects the third clothes, the clothing treatment device 100 may control the supply unit to continue the rest of the basic course.

Referring to FIG. 31, the processor 470 may receive clothing treatment information for the first clothes from the outside (S3110). The processor 470 may detect clothes inside the vehicle 700 (S3130). The processor 470 may determine whether the clothes detected inside the vehicle 700 match the first clothes received from the outside (S3150). When the first clothes match the clothes detected inside the vehicle 700, the processor 470 may control the clothing treatment course of the clothes detected inside the vehicle 700 based on first clothing treatment information (S3170).

According to an embodiment of the disclosure, a clothing treatment device installed in a vehicle comprises a clothing receiving unit including a base plate and a side wall extending from the base plate and forming an internal space, the clothing receiving unit installed on a seat in the vehicle, a door coupled to the clothing receiving unit and opening and closing the internal space, and a supply unit supplying hot air or steam to the internal space. The clothing receiving unit may rotate or slide on the seat.

The seat may include a seat base and a backrest connected with the seat base and having an elongate hole, and the clothing receiving unit may be positioned in the hole.

The base plate may be rendered to face the seat base as the clothing receiving unit slides.

The seat may include a guide rail installed in the hole and facing the side wall. The clothing receiving unit may include a slide installed on an outer surface of the side wall and engaged with the guide rail.

The seat may include a first seat including a first seat base and a first backrest connected with the first seat base, a second seat including a second seat base positioned on a side of the first seat base and a second backrest connected with the second seat base and positioned on a side of the first backrest, and a second hole including a first part formed in the first backrest and a second part formed in the second backrest and communicating with the first part, and wherein the clothing receiving unit is positioned in the second hole.

The seat may include a third seat and a fourth seat positioned on a side of the third seat. The clothing receiving unit may be positioned between the third seat and the fourth seat.

The seat may include a door positioned on a side of the third seat. The base plate may be rendered to face the door as the clothing receiving unit slides.

The seat may include a seat base and a backrest positioned behind the seat base and connected with the seat base. The clothing receiving unit may be installed on a rear surface of the backrest.

The base plate may face the backrest.

The clothing treatment device may further comprise a hinge coupled to the side wall and the backrest.

According to another embodiment of the disclosure, a clothing treatment device provided in a vehicle comprises an interface for transmitting/receiving information to/from at least one device provided in the vehicle, a clothing receiving unit installed on a seat inside the vehicle and providing an internal space, a door for opening/closing the internal space, a supply unit for supplying hot air or steam to the internal space, and a processor opening the door based on at least one of an air contamination level inside the vehicle measured from at least one sensor provided in the vehicle or an occupant's gesture. The processor may control an operation course of the supply unit based on at least one driving state information for the vehicle or the occupant's boarding pattern.

The interface may be connected with a camera capturing surroundings of the seat. The processor may control to move the seat from a first position to a second position and open the door when an obstacle around the seat is detected via the camera.

The processor may move the seat from the second position to the first position when an operation of the supply unit is complete.

The interface may be connected with a camera capturing surroundings of the seat. The processor may control to open the door when the occupant's undressing is detected via the camera.

The driving state information for the vehicle may include at least one of a remaining driving time, destination information, driving route information, or an expected arrival time, and the processor may change the operation course of the supply unit when the driving state information for the vehicle is changed.

The occupant's vehicle boarding pattern may include at least one of a boarding time, boarding time, a driving distance, a driving route, or a type of clothing.

The processor may receive weather information via the interface and control the operation course of the supply unit based on the weather information.

The interface may be connected with a communication unit transmitting and receiving information to/from an outside of the vehicle and a camera capturing surroundings of the seat. The processor may receive clothing treatment information for first clothing via the communication unit and control the operation course of the supply unit based on the clothing treatment information when the first clothing is detected via the camera.

According to the above-described embodiments, the clothing treatment device may enhance the occupant's convenience. The clothing treatment device according to the above-described embodiment may be used during autonomous or semi-autonomous driving of a vehicle.

The foregoing features, structures, or effects are included in, but not limited to, at least one embodiment of the disclosure. The features, structures, or effects exemplified in each embodiment may be combined or modified by one of ordinary skill in the art in other embodiments. Thus, such combinations or modifications should be interpreted as belonging to the scope of the disclosure.

While the disclosure has been shown and described with reference to exemplary embodiments thereof, it will be apparent to those of ordinary skill in the art that various changes in form and detail may be made thereto without departing from the spirit and scope of the disclosure as defined by the following claims. For example, each component in the embodiments may be modified. Such modifications and applications should be construed as included in the scope of the disclosure as defined by the appended claims.

The invention claimed is:

1. A clothing treatment device provided in a vehicle, comprising:
    a clothing receiving unit providing an internal space and installed on a seat in the vehicle;
    a door opening and closing the internal space;
    a supply unit supplying hot air or steam to the internal space;
    an interface transmitting and receiving information to/from at least one device provided in the vehicle; and
    a processor opening the door when a predetermined condition is met,
    wherein the predetermined condition is determined through at least one of a degree of air pollution in the vehicle recognized by at least one sensor provided in the vehicle or an occupant's gesture,
    wherein the processor controls an operation course of the supply unit based on at least one of a remaining driving time or the occupant's vehicle boarding pattern, and
    wherein the processor changes the operation course of the supply unit when the remaining driving time is changed.

2. The clothing treatment device of claim 1, further comprising a sensor unit monitoring the internal space of the clothing receiving unit,
    wherein the processor closes the door when clothing is detected.

3. The clothing treatment device of claim 1, wherein the interface is connected with a camera capturing surroundings of the seat, and
    wherein the processor moves the seat from a first position to a second position and opens the door when an obstacle around the seat is detected via the camera.

4. The clothing treatment device of claim 3, wherein the processor moves the seat from the second position to the first position when an operation of the supply unit is completed.

5. The clothing treatment device of claim 1, wherein the interface is connected with a camera capturing surroundings of the seat, and
    wherein the processor opens the door when the occupant's undressing is detected via the camera.

6. The clothing treatment device of claim 1, wherein the occupant's vehicle boarding pattern includes at least one of a boarding time, a driving distance, a driving route, and a type of clothing.

7. The clothing treatment device of claim 1, wherein the processor receives weather information via the interface and controls the operation course of the supply unit based on the weather information.

8. The clothing treatment device of claim 1, wherein the interface is connected with a communication unit transmitting and receiving information to/from an outside of the vehicle and a camera capturing surroundings of the seat, and
    wherein the processor receives clothing treatment information for first clothing via the communication unit and controls the operation course of the supply unit based on the clothing treatment information when the first clothing is detected via the camera.

* * * * *